United States Patent [19]

Agapiou et al.

[11] Patent Number: 4,555,496

[45] Date of Patent: Nov. 26, 1985

[54] SUPPORTED POLYOLEFIN CATALYST COMPONENTS AND METHODS OF MAKING AND USING THE SAME

[75] Inventors: Agapios Agapiou, Humble, Tex.; John L. H. Allan, Glenrock; Felix I. Jacobson, Westwood, both of N.J.

[73] Assignee: Phillips Petroleum Company, Bartlesville, Okla.

[21] Appl. No.: 615,882

[22] Filed: May 31, 1984

Related U.S. Application Data

[63] Continuation of Ser. No. 409,041, Aug. 20, 1982, abandoned.

[51] Int. Cl.⁴ .................... C08F 4/62; C08F 4/64; C08F 4/68
[52] U.S. Cl. .................... 502/105; 502/107; 502/113; 502/117; 502/119; 502/121; 502/122; 502/123; 502/124; 502/125; 502/126; 502/127; 526/125; 526/137; 526/139; 526/140; 526/141; 526/142
[58] Field of Search ............... 502/105, 126, 127, 113, 502/119, 125, 122, 123, 124, 121, 117, 107

[56] References Cited

U.S. PATENT DOCUMENTS

| | | | |
|---|---|---|---|
| 3,135,809 | 6/1964 | Bosmajian | 260/650 |
| 3,412,174 | 11/1968 | Kroll | 502/117 X |
| 3,582,987 | 6/1971 | Natta et al. | 260/93.5 |
| 3,591,656 | 7/1971 | Kroll | 502/107 X |
| 3,830,787 | 8/1974 | Susa et al. | 260/94.9 |
| 3,888,835 | 6/1975 | Ito et al. | 502/126 X |
| 3,943,067 | 3/1976 | Chan et al. | 252/430 |
| 3,991,260 | 11/1976 | Matsuura et al. | 526/125 |
| 4,013,823 | 3/1977 | Longi et al. | 526/166 |
| 4,071,672 | 1/1978 | Kashiwa | 526/122 |
| 4,076,924 | 2/1978 | Toyota et al. | 526/125 |
| 4,107,413 | 8/1978 | Giannini et al. | 502/126 X |
| 4,107,414 | 8/1978 | Giannini et al. | 502/126 X |
| 4,111,835 | 9/1978 | Foschini et al. | 252/429 |
| 4,143,223 | 3/1979 | Toyota et al. | 502/105 X |
| 4,168,361 | 9/1979 | Oda et al. | 526/348.6 |
| 4,175,171 | 11/1979 | Ito et al. | 502/105 X |
| 4,186,107 | 1/1980 | Wagner | 252/429 |
| 4,211,670 | 7/1980 | Vandenberg | 252/429 |
| 4,226,741 | 10/1980 | Luciani et al. | 502/126 X |
| 4,242,230 | 12/1980 | Ueno et al. | 502/127 |
| 4,242,479 | 12/1980 | Yokota et al. | 502/126 X |
| 4,243,552 | 1/1981 | Welch et al. | 252/429 |
| 4,250,285 | 2/1981 | Minami et al. | 526/125 |
| 4,253,984 | 3/1981 | Imai et al. | 252/429 |
| 4,282,114 | 8/1981 | Ito et al. | 252/429 |
| 4,347,158 | 8/1982 | Kaus et al. | 502/126 X |
| 4,356,295 | 10/1983 | Fujii | 526/125 |

FOREIGN PATENT DOCUMENTS

| | | |
|---|---|---|
| 1496440 | 12/1977 | Japan . |
| 1550708 | 8/1979 | Japan . |
| 2015545 | 9/1979 | Japan . |
| 2023155 | 12/1979 | Japan . |
| 2028843 | 3/1980 | Japan . |
| 2029424 | 3/1980 | Japan . |
| 2037300 | 7/1980 | Japan . |
| 2042566 | 9/1980 | Japan . |
| 1575856 | 10/1980 | Japan . |
| 2047718 | 12/1980 | Japan . |
| 2075033 | 11/1981 | Japan . |

OTHER PUBLICATIONS

The Condensed Chemical Dictionary, 5th Edition, (1956), Pub. by Reinhold Pub. Co., N.Y., N.Y., pp. 203, 205, and 982.

Primary Examiner—Patrick P. Garvin
Attorney, Agent, or Firm—French and Doescher

[57] ABSTRACT

A method of producing a polymerization catalyst component suitable for use in the polymerization of alpha-olefins, which method comprises forming an active component by co-comminuting an inorganic Lewis acid, a first organic electron donor, a support base selected from the group consisting of the Group IIA and IIIA salts and the salts of the multivalent metals of the first transition series with the exception of copper, and a polymerization active tri-, tetra-, or penta- valent transition metal compound of a Group IVB–VIB metal, and heating the active component in an inert hydrocarbon solvent to produce the polymerization catalyst component. The active component can be heated in the inert hydrocarbon solvent in the presence of an additional polymerization active tri-, tetra-, or penta- valent transition metal compound of a group IVB–VIB metal. In addition, a second organic electron donor may be incorporated in the active component.

52 Claims, 11 Drawing Figures

SUPPORTED POLYOLEFIN CATALYST COMPONENTS AND METHODS OF MAKING AND USING THE SAME

This is a continuation application of copending application Ser. No. 409,041, filed Aug. 20, 1982, and now abandoned.

This invention relates to supported polyolefin catalyst components and to methods of making and using such components.

Organometallics have been used in combination with transition metal compounds to catalyze the production of high molecular weight polymers from ethylene and alpha-olefins to produce polymers having high stereoregularity.

The basic catalysts used in these methods are formed by combining a transition metal salt with a metal alkyl or hydride. Titanium trichloride and an aluminum alkyl, such as triethyl aluminum or diethyl aluminum chloride, are often used. However, such catalysts generally have low productivity and produce polymer with low stereoregularity.

Isotactic polypropylene results from a head-to-tail linkage of the monomer units resulting in the asymmetric carbon atoms all having the same configuration. The isotactic index is a measure of the percentage of isotactic isomer in the polymer. Atactic polypropylene results from random linkage of the monomer units. Isotactic polypropylene is a highly useful commercial product having high tensile strength, hardness, stiffness, resilience, clarity and better surface luster. Polypropylene finds extensive commercial use in injection molding, film, sheeting, filament and fiber applications. Commercially useful polypropylene contains essentially the stereoregular or isotactic isomer.

For most applications, the polymer produced using these basic catalysts must be extracted to remove the atactic (non-stereoregular) polymer to increase the percentage of isotactic (stereo-regular) polymer in the final product. It is also necessary to deash polymer produced by this method to remove catalyst residues. The additional production steps of polymer extraction and polymer deashing add significantly to the cost of polymer produced with these basic catalysts.

The first improvement in these catalyts resulted from the use of mixed titanium trichloride and aluminum trichloride as the catalyst with an aluminum alkyl cocatalyst.

Later improvements centered on the supported catalysts. Many early supported catalysts were based on the reaction products of surface hydroxyl containing compounds with transition metal compounds. Examples include the raction product of a transistion metal compound with an hydroxy chloride of a bivalent metal, e.g, $Mg(OH)Cl$ (British Pat. No. 1,024,336), with $Mg(OH)_2$ (Belgian Pat. Nos. 726,832; 728,002; and 735,291), and with $SiO_2$, $Al_2O_3$, $ZrO_2$, $TiO_2$, and $MgO$ (British Pat. Nos. 969,761; 969,767; 916,132; and 1,038,882).

Some later supported catalysts were based on the reaction products of magnesium alkoxides with transition metal compounds. Examples include the reaction product of a transition metal compound with $Mg(OR)_2$ (U.S. Pat. No. 3,644,318 and Belgian Pat. Nos. 737,778; 743,325; and 780,530.)

Other supported catalysts were based on the reaction products of magnesium chloride with transition metal compounds. Titanium compounds were reacted with $MgCl_2$ (U.S. Pat. No. 3,642,746 and Belgian Pat. Nos. 755,185; 744,221; and 747,846.)

Promoted catalysts result from the addition of certain Lewis bases (electron donors) to the catalyst system. The electron donor has in certain situations been combined with titanium trichloride during production of the catalyst. Electron donors have included the ethers, esters, amines, ketones and nitroaromatics. Although the promoted catalysts improved the isotactic index of the polymer, they generally still did not produce polymer of such quality and quantity as to permit the elimination of polymer extraction and polymer deashing to remove catalyst residue.

Recently, a catalyst component with sufficiently high yield to apparently eliminate the necessity for performing polymer deashing and polymer extraction was described in U.S. Pat. No. 4,149,990. The catalyst component disclosed therein was produced by the decomposition of a magnesium halide-electron donor complex with an organoaluminum compound. However, this catalyst was produced in solution, requiring catalyst washing.

Various other patents have issued within the last few years which are concerned with polymerization catalysts which utilize titanium tetrachloride in conjunction with compounds selected from the group comprising magnesium halide, particularly, magnesium chloride, esters, ethers, and aluminum halides. These patents include U.S. Pat. Nos. 4,242,230; 4,143,223; 4,242,479; 4,175,171; 3,888,835; 4,226,741; 4,107,413; and 4,107,414.

Applicants' assignee is the owner of a co-pending patent application, Ser. No. 146,341, filed May 2, 1980 [U.S. Pat. No. 4,347,158 of Aug. 31, 1982]. This U.S. patent application and its counterpart foreign patent applications disclose a catalyst component comprising an active component of titanium tetrachloride and a component support including aluminum trichloride, magnesium chloride, an ether in the form of anisole and an ester in the form of ethyl benzoate in one preferred embodiment of the invention. Applicants have found this catalyst to be effective for the polymerization of alpha-olefins, particularly for the production of polypropylene. Applicants believe, however, that it would be advantageous if this catalyst component could be improved to improve its catalytic efficiency, and/or to improve the isotactic index and/or the bulk density of the produced polypropylene.

As background information for this application, applicants hereby incorporate by reference the disclosure in the specification for the invention forming the subject matter of U.S patent application Ser. No. 146,341, filed May 2, 1980 and now U.S. Pat. No. 4,347,158, including the counterpart foreign applications which have been filed and have been laid open to public inspection.

It is apparent from the disclosure in the patents which relate to catalyst components incorporating titanium tetrachloride, that the titanium tetrachloride must be impregnated into the catalyst component. It is apparent from these patents that free or unimpregnated titanium tetrachloride or complexes thereof or other titanium compounds resulting therefrom, is harmful to the effective use of such catalyst components. For this reason, in the manufacture of such catalyst components, care is taken to ensure that all traces of free or unimpregnated titanium compounds or complexes are removed from the catalyst component. This is usually done by washing the catalyst components after formation thereof, four or more times with inert hydrocarbon solvents until all traces of chloride have disappeared. Once it is clear that no chloride remains in the washing solvent, no further titanium remains in unimpregnated form on the catalyst component. The catalyst component is then in a condition for use.

It is one object of this invention to provide a catalyst component which can reduce or overcome at least some of the disadvantages of the prior known catalyst components.

In accordance with one aspect of the invention, a method of producing a polymerization catalyst component suitable for use in the polymerization of alpha-olefins, comprises:
(a) forming a component support by co-comminuting an inorganic Lewis acid, a first organic electron donor, and a support base selected from the group consisting of the Group IIA and IIIA salts and the salts of the multivalent metals of the first transition series with the exception of copper;
(b) then forming an active component by co-comminuting the component support with a polymerization active tri-, tetra-, or penta-valent transition metal compound of a Group IVB–VIB metal; and
(c) heating the active component in an inert hydrocarbon solvent to produce the polymerization catalyst component.

Figure 1:
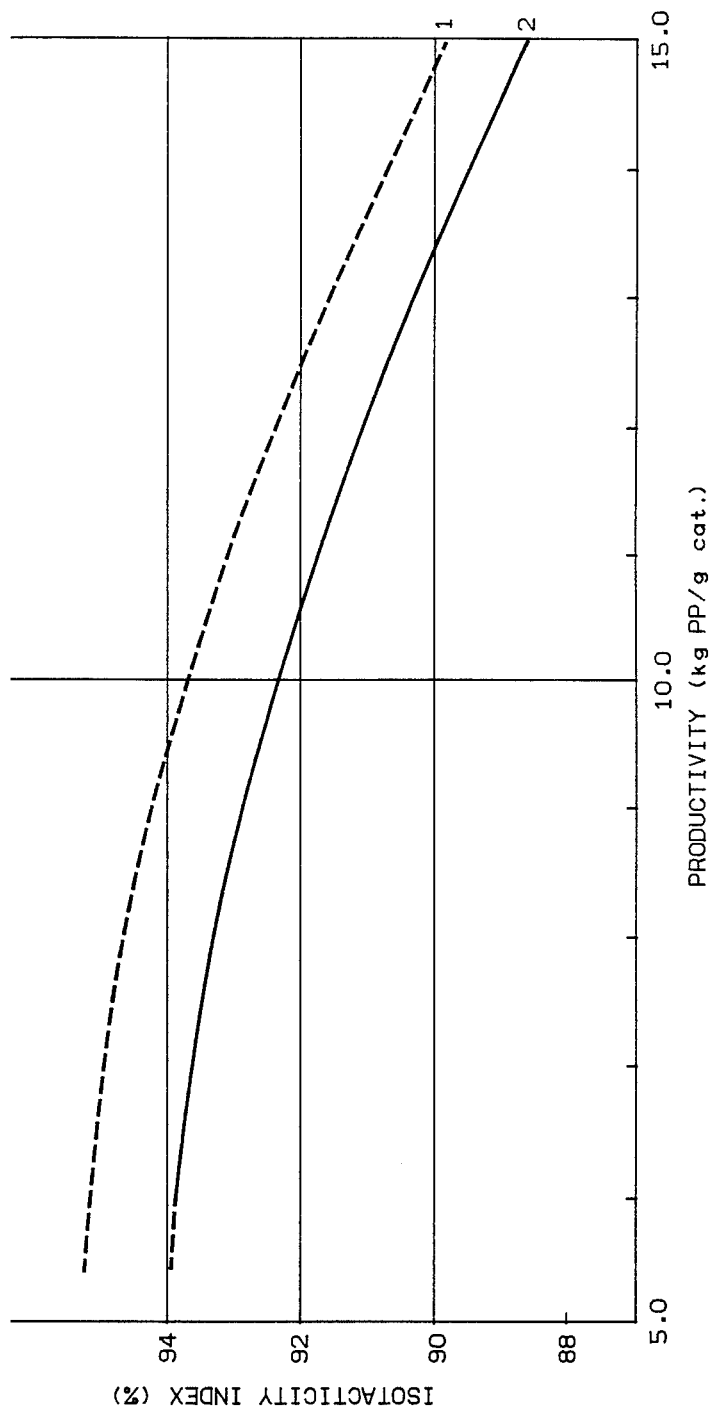
FIG. 1 is a graph comparing the performance of grade 700 catalyst and grade 750 catalyst.

Applicants have found that preferred embodiments of the catalyst component of this invention constitute high efficiency catalyst components for use in the polymerization of olefins, particularly alpha-olefins. Although the catalyst components have only been used in the production of polypropylene, applicants believe that the catalyst components will also be useful for the production of satisfactory homopolymers or copolymers from other alpha-olefins, low molecular weight dienes, and ethylene.

Co-comminution is a term used in the catalyst art to mean co-grinding or co-pulverization of components.

In this particular aspect of the invention, applicants believe that the sequence of steps involved in forming the active component, namely first forming a component support and then forming the active component by co-comminuting the component support with a polymerization active transition metal compound, will provide an active component which yields a very effective catalyst component. Applicants believe that while the order of addition of the components forming the component support may be varied, a less effective catalyst component will tend to be produced if the polymerization active transition metal compound is incorporated before the component support has been formed.

In an embodiment of this aspect of the invention, the active component may be heated in the inert hydrocarbon solvent in the presence of an additional polymerization active tri-, tetra-, or penta-valent transition metal compound of a Group IVB–VIB metal.

In this way, an additional quantity of the polymerization active transition metal compound can be incorporated into the catalyst component. This additional quantity of polymerization active transition metal compound, or the reaction product thereof including, for example, complexes thereof with one or more of the donors present in the system, may be incorporated into the catalyst component slurry by being incorporated into the solid portion of the catalyst component itself, by being incorporated into the liquid portion of the catalyst component, or by being incorporated partly into the solid portion and partly into the liquid portion of the catalyst component slurry.

It must be appreciated that, in this specification, when it is specified that certain components are incorporated into the catalyst component of this invention, the description of such components will include donor components which, in the formation of the catalyst component in accordance with this invention, will yield the required constituents or components for the catalyst component as well as complexes and the like of such components. It is of course apparent that donor components which also yield harmful compounds which cannot readily or effectively be removed from the catalyst component formed in accordance with this invention, should not be used.

The method of this invention may preferably include the step of incorporating a second organic electron donor.

The second organic electron donor may be co-comminuted together with the component support, with the components of the component support, with the active transition metal compound or after the addition of the active transition metal compound.

The first and second electron donors may be the same or may be different, and may conveniently be selected from the group consisting of organic electron donor compounds containing at least one atom of oxygen, sulfur, nitrogen or phosphorous to function as the electron donor atom.

In an embodiment of the invention, the first and second electron donors may be selected from the group consisting of ethers, esters, ketones, aldehydes, alcohols, carboxylic acids, phenols, thioethers, thioesters, thioketones, amines, amides, nitriles, isocyanates and phosphines.

In a preferred embodiment, the first and second electron donors are selected from the group consisting of ethers and esters. Thus, in a specific preferred embodiment of the invention, the first electron donor is an ether in the form of anisole, and the second electron donor is an ester in the form of ethyl benzoate (E.B.).

In the presently preferred method of preparing the catalyst component of this invention, the support base will be used in anhydrous form. Alternatively, however, the support base may be co-comminuted with a suitable dehydrating agent. If a suitable dehydrating agent is employed, it need not be removed since it does not appear to have any harmful effects on the catalyst performance. Calcium hydride, calcium carbide and the silicon tetrahalides are acceptable dehydrating agents, although silicon tetrachloride is the preferred agent.

The support base is then preferably first co-comminuted with the inorganic Lewis acid in a mill, preferably in a vibratory ball mill.

Thereafter, the first electron donor may be incorporated by co-comminution to form the component support. Thereafter the second electron donor should be incorporated by co-comminution with the component support, followed by the incorporation of the active transition metal compound.

The inert hydrocarbon solvent may be selected from a wide group of inert saturated hydrocarbons. Thus, for example, the solvent may be an aliphatic hydrocarbon, such as an aliphatic hydrocarbon having between about two and nine carbon atoms. In a preferred embodiment of the invention, the saturated hydrocarbon may have between about two and seven carbon atoms. The saturated hydrocarbon solvent may therefore be selected from the group consisting of heptane, hexane, pentane, particularly iso-pentane, butane and ethane.

Alternatively, for example, the inert hydrocarbon solvent may be a cycloalkane such as, for example, a cycloalkane having between about three and seven carbon atoms.

Where the inert hydrocarbon solvent is a hydrocarbon having a relatively low boiling point, the catalyst component of this invention will be formed under sufficient pressure for the solvent to operate effectively as a liquid solvent.

Applicants believe that such a catalyst component slurry formed in accordance with this invention with a relatively low boiling point solvent, could be advantageous in certain instances in the gas phase polymerization of olefins. During such polymerization flashing off of the solvent will tend to suppress the heat of polymerization and will deposit the active transition metal dissolved in the solvent, onto the solid portion of the catalyst component for effective utilization during polymerization.

While the proportion of solvent used in preparing the catalyst component in accordance with this invention, may be varied over a range, the solvent to component ratio may conveniently be at least sufficient for adequate wetting of the component to permit effective mixing.

In an embodiment of the invention, the solvent to component ratio may be between about 3:1 and about 1:3 by weight.

In a preferred embodiment of the invention, the component ratio is between about 2:1 and 1:1 by weight. In a presently most preferred embodiment of the invention, the solvent to component ratio is about 3:2 by weight.

The inorganic Lewis acid may conveniently be a metal salt selected from the group consisting of the Group IIIA halides, phosphorous trichloride and phosphorous oxytrichloride.

In a preferred embodiment of the invention, the Lewis acid is an aluminum halide, and most preferably an aluminum trichloride.

The support base is preferably a magnesium or manganese salt, and most preferably a magnesium halide such as magnesium chloride.

The polymerization active transition metal compound is preferably a compound of the formula $MO_p(OR)_mX_{n-2p-m}$. M is a Group IVB–VIB metal with valency $n = 3$, 4 or 5. The metals titanium, vanadium, chromium and zirconium are preferred. Presently it appears that titanium is the most preferred metal due to its superior productivity. O is oxygen. p is 0 or 1. R is an alkyl, aryl, cycloalkyl group or substituted derivative threof, where $0 \leq m \leq n$. X is any halide, i.e., chloride, bromide, iodide or fluoride, although the chloride is preferred. The preferred active transition metal compound is a titanium tetrahalide, and particularly titanium tetrachloride. It is presently believed that the active transition metal, preferably tetravalent titanium, is not reduced to the trivalent state in the catalyst component. Rather, it is presently believed that this reduction takes place in situ after addition of the organometallic compound during polymerization.

The proportion of titanium incorporated in the polymerization catalyst component of this invention may be varied over a fairly wide range. Applicants have found that the proportion of titanium has a direct influence on the catalyst efficiency or productivity (the "C.E."), on the isotacticity index (the II) and on the polymer bulk density. The titanium content may therefore be adjusted to obtain the desired balance between the productivity, the isotacticity and the bulk density.

In an embodiment of the invention, the titanium content in the polymerization catalyst component of this invention may be between about 2% and about 10% by weight of titanium as metal based on the weight of the solid portion of the catalyst component.

In a presently preferred embodiment of this invention, the titanium content is between about 3 to 6% by weight of titanium as metal based on the weight of the solid portion of the catalyst component.

Applicants believe that at least a portion of the titanium component should be incorporated into the solid portion of the catalyst component, and at least a portion of the titanium component should preferably be contained in the liquid portion of the catalyst component.

In one embodiment of this aspect of the invention, the portion of titanium incorporated into the solid portion of the catalyst component comprises at least about 40 to 60% by total weight of the total titanium content.

In a preferred embodiment of the invention, the portion of titanium incorporated into the solid portion of the catalyst component is at least about 70 to 75% by weight of the total titanium content.

If the heating step or the period of heating is too short the full benefit of this invention will not be provided. The heating step of the process of this invention may therefore be performed at an appropriate temperature and for an appropriate period to provide the catalyst component which will provide a suitable productivity, isotacticity and bulk density during use. Thus, for example, the active component may be heated in the inert hydrocarbon solvent at a temperature of between about 40° to 150° C. for a period of between about 1 to 24 hours.

In a presently preferred embodiment of the invention, the active component is heated in the inert hydrocarbon solvent at a temperature of between about 60° to 100° C. for a period of between about 2 to 24 hours.

It will be appreciated that the temperature and heating period will tend to vary depending also on the specific inert hydrocarbon solvent utilized in carrying out the process of this invention.

In the same way, it will be appreciated that the effectiveness of the catalyst component will be effected by the particular choice of inert hydrocarbon solvent. Applicants presently believe that hydrocarbon solvents with fewer carbon atoms, such as isopentane, butane, or possibly even ethane may tend to yield still a better catalyst component in accordance with this invention.

Applicants have found that the proportions of the components of the catalyst component of this invention may be varied over a certain range, and that the quality of the catalyst component will be influenced by the variation of the proportions of the components.

In one example of the invention, the method of this invention may be carried out such that for every eight moles of support base used, up to about three moles of Lewis acid are used, between about 0.5 to about 3 moles of first electron donor are used, between about 0.5 to about 3 moles of second electron donor are used, and between about 0.1 and about 5 moles of active transition metal compound are used.

In one embodiment of the invention, for every eight moles of support base used, between about 0.5 to about 2 moles of Lewis acid may be used, between about 1.0 to about 1.5 moles of first electron donor may be used, between about 0.8 and about 2 moles of second electron donor may be used, and between about 0.4 and about 2 moles of active transition metal compound may be used.

In a preferred example of this embodiment of the invention, the support base may be $MgCl_2$, the Lewis acid may be $AlCl_3$, the first electron donor may be anisole, the second electron donor may be ethyl benzoate, and the active transition metal compound may be $TiCl_4$.

In a preferred example of this embodiment of the invention, the individual constituents are used in the following proportions:
(a) $MgCl_2$—about 8 moles;
(b) $AlCl_3$—about 1 mole;
(c) anisole—about 1.25 moles;
(d) ethyl benzoate—about 1.5 moles; and
(e) $TiCl_4$—about 1.5 moles.

In an alternative example of this preferred aspect of the invention, the individual constituents are in the following proportions:
(a) $MgCl_2$—about 8 moles;
(b) $AlCl_3$—about 0.7 moles;
(c) anisole—about 1.25 moles;
(d) ethyl benzoate—about 1.5 moles; and
(e) $TiCl_4$—about 1.5 moles.

In yet a further alternative example of this embodiment of the invention, the individual constituents are in the following proportions:
(a) $MgCl_2$—about 8 moles;
(b) $AlCl_3$—about 1 mole;
(c) anisole—about 1.25 moles;
(d) ethyl benzoate—about 1.5 moles; and
(e) $TiCl_4$—about 1 mole.

The polymerization catalyst component of this invention may be recovered as a slurry and may be used as such in the form of a slurry for the polymerization of alpha-olefins.

In an alternative embodiment of the invention, the inert hydrocarbon solvent may be at least partially evaporated after the heating step to yield the catalyst component for use. If desired, the inert solvent may be evaporated completely after the heating step, and the catalyst component may be dried for use.

It will be appreciated that when the polymerization catalyst component of this invention is used in the form of a slurry, without removal of the inert hydrocarbon solvent, the excess transition metal or titanium contained in the solvent will remain therein during use of the catalyst component in polymerization.

In the same way, when the inert solvent is partially or completely evaporated, the excess transition metal or titanium contained in the solvent will tend to deposit on the solid portion of the catalyst component. Such excess transition metal or titanium will therefore again be present during use of the catalyst component in polymerization of olefins.

In most of the prior art catalyst systems which utilize similar types of catalyst components, great care is taken to insure that no excess transition metal, particularly titanium, remains associated with the catalyst since it has been found to have a significant harmful effect during use. Great care is therefore taken to thoroughly wash the catalyst components of the prior art to remove all traces of free transition metal or titanium components or complexes which are not impregnated directly into the catalyst components. A number of prior art patents therefore specifically teach that the catalyst components must be washed at least four times (and often up to seven or more times) to insure that every trace of free or non-impregnated or non-deposited transition metal or titanium component or complex is removed from the catalyst component.

Applicants have unexpectedly and surprisingly found that, contrary to the specific teachings of the prior art, such unimpregnated or free titanium component, compound or complex contained in the catalyst component of this invention, does not have any deleterious effect on the performance of the catalyst component of this invention. Indeed, applicants have surprisingly found that the additional titanium or active transition metal compound, component or complex which can be incorporated into the catalyst component through the method of this invention is advantageous and will generally provide a catalyst component which is significantly more effective than a similar catalyst component in which such free or unimpregnated titanium has not been incorporated.

In an alternative embodiment of the invention the inert solvent may be filtered off after the heating step to yield a solid catalyst component in accordance with this invention for use in the polymerization of alpha-olefins. Because applicants have found that unimpregnated titanium tetrachloride does not appear to have any harmful effect and is usually beneficial, the inert solvent may simply be filtered off without any necessity to wash the remaining solid catalyst component.

Since the catalyst component in accordance with this invention may be used in slurry form, or may be used in the form of a solid catalyst component where the inert solvent has either been evaporated or has been filtered off, it is clear that the amount of inert solvent used in the heating step of this invention, should be limited. By limiting the quantity of inert hydrocarbon solvent, catalyst output can be maximized. In addition, of course, it will limit the cost of producing the catalyst component since it will limit the quantity of solvent to be handled in the process. It will also have a marked effect upon the cost of operating the process where the solvent is to be evaporated off after treatment or where the solvent is to be filtered off. Where the solvent is to be filtered off, the quantity of solvent will naturally affect the cost involved in cleaning the solvent for further use.

Applicants believe that the catalyst component of this invention can provide substantial advantages over catalyst components in which, as taught in the prior art, substantial washing is necessary to remove free, non-impregnated or unbonded transition metal or titanium components. If it is necessary to wash the solid catalyst four or more times to remove all traces of free titanium from the catalyst component, the capital cost in setting up a plant to handle the washing fluid, including cleaning and recovery thereof, can require a capital investment increase of 5 to 8 times. In addition, of course, the operating costs will increase by a factor of several times.

The invention further extends to a method of producing a polymerization catalyst component suitable for use in the polymerization of alpha-olefins, which method comprises:

(a) forming an active component by co-comminuting an inorganic Lewis acid, a first organic electron donor, a support base selected from the group consisting of the Group IIA and IIIA salts and the salts of the multivalent metals of the first transition series with the exception of copper, and a polymerization active tri-, tetra-, or penta-valent transition metal compound of a Group IVB–VIB metal; and (b) heating the active component in an inert hydrocarbon solvent to produce the polymerization catalyst component.

Applicants have found that the various constituents of the active component may be combined separately in separate groups to form complexes, and may then be added together for co-comminution to form the active component.

In accordance with yet a further aspect of the invention a method of producing a polymerization catalyst component suitable for use in the polymerization of alpha-olefins, comprises:

(a) forming a component support by co-comminuting an inorganic Lewis acid, a first organic electron donor in the form of an ether, and a support base selected from the group consisting of the Group IIA and IIIA salts and the salts of the multivalent metals of the first transition series with the exception of copper; and (b) heating the component support in an inert hydrocarbon solvent in the presence of a polymerization active tri-, tetra-, or penta-valent transition metal compound of a Group IVB–VIB metal to produce the polymerization catalyst component.

As before, this aspect of the invention may include the step of incorporating a second organic electron donor in the component support.

The invention further extends to a polymerization catalyst component suitable for use in the polymerization of alpha-olefins, the component being a catalyst component produced by any one of the methods described herein.

The invention further extends to a polymerization catalyst component comprising an inorganic Lewis acid, a first organic electron donor, a support base selected from the group consisting of the Group IIA and IIIA salts and the salts of the multivalent metals of the first transition series with the exception of copper, and a polymerization active tri-, tetra-, or penta-valent transition metal compound of a Group IVB–VIB metal, the catalyst component having a significant proportion of non-impregnated polymerization active transition metal compound component or complex associated therewith. This proportion may be associated with the catalyst component by being deposited onto the solid portion of the catalyst component and/or by being contained in a liquid portion of the catalyst component.

For the production of polyolefins, the catalyst component of this invention will be used with a suitable co-catalyst. The co-catalyst should preferably be an organometallic co-catalyst.

The presently preferred organometallic co-catalyst is selected from the group comprising the trialkyl aluminums, the alkyl aluminum halides, and the alkyl aluminum hydrides. The most preferred co-catalyst is triethyl aluminum (TEAL).

Applicants have found that the further addition of another electron donor during polymerization increases the yield of stereoregular polymers. The electron donor may be added prior to, during, or after addition of the co-catalyst or may be added as a preformed complex with the co-catalyst. The electron donor is conveniently selected from the same group as the electron donors incorporated into the catalyst component. The preferred electron donors are the aromatic esters, with methyl p-toluate (MPT) especially preferred.

The molar ratio of organometallic co-catalyst to titanium containing catalyst component, preferably moles of triethyl aluminum to gram-atoms of Ti in the catalyst component of the present invention may range up to about 400 to one. In laboratory liquid pool polymerization, the range of about 150–300 to one is presently believed to be preferred, with about 240 to one especially preferred. In continuous production processes, a range of about 30–200 to one is presently believed to be preferred. The electron donor is selected from the same group as the electron donors of the catalyst component and may be the same or different therefrom. Preferred electron donors are selected from the esters of aromatic acids such as ethyl anisate, methyl p-toluate (MPT) or ethyl benzoate. The most preferred electron donor is methyl p-toluate (MPT). The preferred molar ratio of organometallic co-catalyst to electron donor component, preferably moles of triethyl aluminum to moles of methyl p-toluate of the present invention is about 1.0–20.0 to one, most preferably about 2.0–3.5 to one.

The invention therefore extends to a method of producing polymers, particularly polypropylene, by the methods described herein and to polymers whenever produced by the method described herein.

The catalyst component of this invention, together with a co-catalyst may be used in the standard methods for the polymerization of alpha-olefins. The catalysts may therefore, for example, be used in liquid pool, inert solvent or gas phase preparation methods.

The active component of this invention may, in a presently preferred embodiment of the invention, be prepared by co-comminution of the constituents under an inert atmosphere in a ball or vibration mill. The support base is preferably initially charged into the mill. The support base will preferably be charged into the mill in dehydrated form. If the support base does, however, contain water which must be removed, a sufficient quantity of dehydrating agent will be initially added to the support base and the resulting mixture co-comminuted at a temperature of between about 0° C. and about 90° C. for from about 15 minutes to about 48 hours. Preferably this mixing would be from about 6 hours to about 24 hours, optimally for about 15 hours at temperatures between about 35° C. and about 50° C.

Although co-comminution may take place at temperatures between about 0° C. and about 90° C. the preferred mixing temperature is from about 15° C. to about 50° C. Mixing times may range from about 15 minutes to about 48 hours. Preferred mixing times are from about 12 hours to about 20 hours, with optimal mixing at about 16 hours. Insufficient mixing will not yield a homogeneous compound, while overmixing may cause agglomeration or may significantly decrease particle size of the catalyst component, causing a direct reduction in particle size of the polypropylene produced from the catalyst component.

In an alternative embodiment a support base containing water, the dehydrating agent and the Lewis acid are charged into the ball or vibration mill together and co-comminuted at temperatures between about 0° C. and about 90° C. for from about 15 minutes to about 48 hours. Preferably this mixing is for from about 12 hours to about 20 hours, optimally about 16 hours, at temperatures between about 15° C. and about 50° C.

A first electron donor is co-comminuted with the support base, Lewis acid and dehydrating agent if used, to produce the enhanced support. Mixing may be at temperatures between about 0° C. and about 90° C. for from about 30 minutes to about 48 hours. The preferred mixing temperatures are from about 15° C. to about 50° C. for from about one hour to about 5 hours, although co-comminution for about 3 hours is optimal.

To the enhanced support produced as described above is added the active transition metal compound. Although many transition metal compounds of the formula $MO_p(OR)_m X_{n-2p-m}$ as described above will provide satisfactory catalyst components, liquid titanium tetrachloride is the preferred active compound. Such an active transition metal compound is added to the ball or vibration mill and co-comminuted therein with the enhanced support. This mixing may be at temperatures from about 0° C. to about 90° C. and for from about 15 minutes to about 48 hours. It is preferred that this mixing take place at temperatures ranging from about 40° C. to about 80° C. and for from about 12 hours to about 20 hours, optimally for about 16 hours, to produce the supported high efficiency catalyst component.

In an alternative embodiment of the invention a second electron donor which may be different from or the same as the first electron donor may be co-comminuted with the enhanced support prior to addition of the active transition metal compound. In the preferred embodiment ethyl benzoate is co-comminuted in the ball or vibration mill with the enhanced support at temperatures from about 0° C. to about 90° C. for from about 15 minutes to about 48 hours prior to addition of titanium tetrachloride. However, the preferred mixing is at from about 15° C. to about 50° C. for from about one hour to about 5 hours, optimally about 3 hours.

In another alternative embodiment of the invention, the second electron donor, e.g., ethyl benzoate, may be premixed with the active transition metal compound, e.g., titanium tetrachloride, prior to addition of the resulting complex to the enhanced support. This complex is then mixed with the enhanced support under the conditions and for the time specified above for the active transition metal compound.

Specific embodiments of the invention are now illustrated by way of example with reference to the following examples. These examples are designed to illustrate embodiments of the invention and are not intended to limit the invention in any respects.

In connection with the specific examples, certain code words and numerals have been used to identify specific active components and specific catalyst components in accordance with this invention. These have the following meanings:

(a) Grade 700 catalyst—This means a catalyst component in accordance with one preferred embodiment of the invention disclosed in U.S. patent application Ser. No. 146,341, filed May 2, 1980 [U.S. Pat. No. 4,347,158 of Aug. 31, 1982]—owned by the same assignee as the assignee of the present application. Grade 700 catalyst component is formed by co-comminution of certain components in a ball mill, with the components being used in the following mole ratios: 8 $MgCl_2$, 1.5 $AlCl_3$; 1.25 anisole; 1.5 ethyl benzoate; 0.51 $TiCl_4$.

(b) Grade 700 modified catalyst—This means a Grade 700 catalyst component which is modified so the mole ratio of $AlCl_3$ changes from 1.5 moles of $AlCl_3$ to 1.0 moles of $AlCl_3$.

(c) Grade 750 catalyst—This means Grade 700 catalyst as active component formed into a catalyst component in accordance with this invention by heating in the presence of an inert hydrocarbon solvent in the form of *hexane*.

(d) Grade 751 catalyst—This means Grade 700 catalyst as active component formed into a catalyst component in accordance with this invention by heating in the presence of an inert hydrocarbon solvent in the form of *heptane*.

(e) Grade 752 catalyst—This means Grade 700 catalyst as active component formed into a catalyst component in accordance with this invention by heating in the presence of an inert hydrocarbon solvent in the form of *mineral oil* (PRIMOL-355 of Exxon).

(f) Grade 750 modified catalyst—This means Grade 700 modified catalyst as active component formed into a catalyst component in accordance with this invention by heating in the presence of an inert hydrocarbon solvent in the form of *hexane*.

(g) Grade 751 modified catalyst—This means Grade 700 modified catalyst as active component formed into a catalyst component in accordance with this invention by heating in the presence of an inert hydrocarbon solvent in the form of *heptane*.

(h) Grade 760 catalyst—This means Grade 700 catalyst as active component formed into a catalyst component in accordance with this invention by heating in the presence of an inert hydrocarbon solvent in the form of *hexane*, except that further $TiCl_4$ has been incorporated in the solvent.

(i) Grade 761 catalyst—This means Grade 700 catalyst as active component formed into a catalyst component in accordance with this invention by heating in the presence of an inert hydrocarbon solvent in the form of *heptane*, except that further $TiCl_4$ has been incorporated in the solvent.

(j) Grade 760 modified catalyst—This means Grade 700 modified catalyst as active component formed into a catalyst component in accordance with this invention by heating in the presence of an inert hydrocarbon solvent in the form of *hexane*, except that further $TiCl_4$ has been incorporated in the solvent.

(k) Grade 761 modified catalyst—This means Grade 700 modified catalyst as active component formed into a catalyst component in accordance with this invention by heating in the presence of an inert hydrocarbon solvent in the form of *hexane*, except that further $TiCl_4$ has been incorporated in the solvent.

EXAMPLE I

Preparation of Standard Grade 700 Catalyst

A standard grade 700 catalyst was prepared by charging 2500 g of anhydrous $MgCl_2$ and 656 g of anhydrous $AlCl_3$ into a 10 liter vibratory mill, and milling the mixture for 16 hours at 30° C. 440 g of anisole was then added over a period of 30 minutes to the mill and the mixture was milled for a total of 3 hours at 30° C. 739 g of ethyl benzoate was then added to the mill over a period of 30 minutes and milling was continued for a total of 3 more hours at 30° C. Finally, 310 g of $TiCl_4$ was added to the mill over a period of 30 minutes and milling was continued for 8 more hours at 30° C. This yielded the standard grade 700 catalyst with the components being used in the mole ratio of 8 $MgCl_2$; 1.5 $AlCl_3$; 1.25 anisole; 1.5 ethylbenzoate; and 0.51 $TiCl_4$.

This grade 700 catalyst corresponds with one preferred embodiment of the catalyst disclosed in co-pending U.S. patent application Ser. No. 146,341, filed May 2, 1980 and now U.S. Pat. No. 4,347,158. This grade 700 catalyst was used in some of the following examples as the active component for forming a catalyst component in accordance with this invention.

EXAMPLE II

Preparation of Standard Grade 700 Modified Catalyst

Grade 700 modified catalyst was prepared in exactly the same way as the grade 700 catalyst was prepared in Example I, except that the mole ratios were varied so that the proportion of $AlCl_3$ mole ratio was varied from 1.5 to 1.0, and except that the ethyl benzoate was added before the anisole.

EXAMPLE III

Preparation of Grade 751 Catalyst

A grade 751 catalyst was in accordance with one embodiment of this invention by using the standard grade 700 catalyst as prepared in with Example I. 100 g of the grade 700 catalyst prepared in accordance with Example I were charged into a 500 ml airless flask equipped with a mechanical stirrer. To this was added 100 g of n-heptane and the mixture was stirred at 95° C. for 20 hours. Heating was discontinued and the mixture was stirred for an additional 0.5 hour until it was at room temperature. This yielded the 751 catalyst.

EXAMPLE IV

Preparation of Grade 761 Catalyst

A grade 761 catalyst component in accordance with this invention was prepared usin grade 700 catalyst of Example I as the active compenent. 100 g of the grade 700 catalyst of Example I were charged into a 500 ml airless flask equipped with a mechanical stirrer. To this was added 100 g of n-heptane containing 0.5 moles of $TiCl_4$ to every 8 moles of $MgCl_2$ contained in the grade 700 catalyst. This mixture was stirred at 95° C. for 20 hours, then brought to room temperature with stirring. This yielded the grade 761 catalyst component in slurry form.

EXAMPLE V

Polymerization of Propylene Using Grade 700, Grade 751 and Grade 761 Catalysts of Examples I, III and IV A one liter autoclave (cleaned and purged with nitrogen) was charged with 2.0 m mole of $Et_3Al$ (TEAL) (25% by weight in heptane) followed by 0.59 m mole of methyl p-toluate (MPT) (0.4 M in heptane) and 14 or 20 mg of one of the catalysts of Example I, Example III or Example IV. In each case 675 ml of hydrogen at S.T.P. was measured into the autoclave followed by the addition of 700 moles of liquid propylene. The mixture was in each case heated to 70° C. and allowed to react for 1 hour. At the end of this period unpolymerized monomer was vented off, and the polymer was dried and weighed. The results of the polymerization experiments conducted on the catalyst components of Examples I, III and IV are set out in Table 1 below:

TABLE 1

| Catalyst | Productivity (g-PP/g-Cat) | II % | Polymer Bulk Density (untapped g/cc) |
| --- | --- | --- | --- |
| Grade 700 Catalyst of Ex. I | 10,500 | 92.8 | 0.36 |
| Grade 751 Catalyst of Ex. III | 10,100 | 93.1 | 0.43 |
| Grade 761 Catalyst of Ex. IV | 11,000 | 94.0 | 0.40 |

It will be noted from Table I above, that the grade 751 catalyst prepared in Example III provided a marginally reduced productivity over the grade 700 catalyst of Example I. However, it provided an improved isotacticity and a substantially improved polymer bulk density. Insofar as the grade 761 catalyst of Example IV is concerned, it provided an improved productivity over the grade 700 catalyst, a substantially improved isotacticity, and a substantially improved polymer bulk density. The substantially improved isotacticity index of the grade 761 catalyst together with its improved bulk density and productivity in relation to the grade 700 catalyst, is particularly surprising since the grade 761 catalyst incorporates additional titanium tetrachloride and was used without the extensive washing which the prior art teaches as absolutely essential.

EXAMPLE VI

The Effect of Filtration and Hydrocarbon Wash on Grade 751 Catalyst

To investigate the effect of filtration and hydrocarbon wash on the grade 751 catalyst, a grade 751 catalyst was prepared substantially in the manner in which it was prepared in Example III. That is grade 700 catalyst was used as the active component and was slurried in n-heptane and stirred at 90° to 95° C. for 6 hours. This catalyst component was used as a grade 751 slurry to test the performance thereof. However, a portion of the grade 751 slurry was used to prepare a grade 751, solid catalyst component by decantation of the grade 751 catalyst slurry, followed by exhaustive washing thereof with n-heptane and filtration. The performance of the grade 751 solid as a polymerization catalyst component was then compared with the performance of the grade 751 slurry as a catalyst component.

The comparative results are set out in Tables 2A and 2B below:

TABLE 2

| The Effect of Filtration and Hydrocarbon Wash on the Grade 751 Catalyst Peformance | | | |
| --- | --- | --- | --- |
| Catalyst Number | Productivity Kg PP/g Cat | Isotacticity II (%) | Polymer Bulk Density g/cc |
| Grade 751 Catalyst Slurry | | | |

TABLE 2-continued

The Effect of Filtration and
Hydrocarbon Wash on the Grade 751
Catalyst Peformance

| Catalyst Number | Productivity Kg PP/g Cat | Isotacticity II (%) | Polymer Bulk Density g/cc |
|---|---|---|---|
| 2287-41W | 11.4 | 93.9 | 0.43 |
| 2327-IW | 12.0 | 93.3 | 0.43 |
| Grade 751 Catalyst Solid | | | |
| 2287-41D | 11.5 | 93.2 | 0.41 |
| 2327-ID | 10.7 | 92.9 | 0.40 |

It will be noted from Tables 2A and 2B above that the grade 751 catalyst in slurry form tends to provide an improved performance both in relation to productivity and isotacticity, and provides a substantial improvement of performance in regard to polymer bulk density over the grade 751 catalyst in solid form. This substantiates the surprising result that the grade 751 slurry which is "contaminated" with nonimpregnated titanium compound does, contrary to the teachings of the prior art, provide an improved catalyst component over the catalyst component which has been thoroughly washed to remove any free titanium compounds. If the teachings of the prior art were respected, the performance results set out in Table 2B above would be expected to be substantially better than the performance results set out in Table 2A above.

EXAMPLE VII
Evaluating the Effect of Filtration and Hydrocarbon Wash on the Grade 761 Catalyst Performance Experiments similar to those of Example VI were performed on the Grade 761 catalyst component prepared in a similar manner to that of Example IV to determine the effect of filtration and hydrocarbon wash on the grade 761 catalyst performance.

The Grade 761 catalyst component was perpared in a manner very similar to that of Example IV by slurrying the grade 700 catalyst (of Example I) in n-heptane in the presence of additional TiCl$_4$ at 90° to 95° C. for 6 hours.

Sufficient additional TiCl$_4$ was incorporated in the n-heptane to provide a final content of titanium as titanium metal in the catalyst slurry of 5.36% of the solid catalyst component content. From an analysis of the supernatant liquid of the slurry, it was found that of this 5.36% titanium as titanium metal, 4.04% thereof was impregnated into the solid portion of the catalyst component, while the remaining 1.32% was dissolved in the liquid portion of the catalyst component. The grade 761 catalyst slurry was separated into separate parts. The one part was used as the grade 761 catalyst slurry component for the polymerization of propylene. The other part was converted into grade 761 catalyst solid by slurry decantation, heptane wash and filtration. The grade 761 catalyst solid was used as a catalyst component for the polymerization of propylene to compare that with the performance of the grade 761 catalyst slurry. The performance results are set out in Table 3 below.

TABLE 3

The Effect of Filtration and
Hydrocarbon Wash on the Grade 761
Catalyst Peformance

| Catalyst Number | TEAL/MPT ratio Mol. | Productivity Kg PP/g Cat | II (%) | Polymer Bulk Density g/cc |
|---|---|---|---|---|
| Grade 761 Catalyst Slurry (5.36% Ti as proportion of solid portion of catalyst component) | | | | |
| 2363-11 | 3.0 | 15.2 | 94.6 | 0.44 |
| 2373-11 | 2.5 | 11.5 | 96.2 | 0.44 |
| Grade 761 Catalyst, Solid (4.04% Ti) | | | | |
| 2363-11 | 3.0 | 13.6 | 95.6 | 0.42 |
| 2373-11 | 2.5 | 9.2 | 96.3 | 0.43 |

It will be noted from Table 3 above that the isotacticity of the solid component is marginally higher than that of the slurry component, but that the bulk density and the productivity of the slurry component is significantly higher than the bulk density and productivity of the solid component. This again substantiates the surprising result that the presence of unimpregnated titanium compounds, components or complexes in the liquid portion of the catalyst component are not harmful and can in fact provide an improved bulk density and productivity while maintaining a substantially corresponding isotacticity. This again, therefore, substantiates the unexpected result provided by a catalyst component in accordance with this invention.

EXAMPLE VIII
Comparison of Catalysts Prepared Using Grade 700 and Grade 700 Modified Catalyst Formulations A number of experiments were then conducted to compare the performance of catalyst components in accordance with this invention which were prepared using the grade 700 catalyst as the active component and then using the grade 700 modified catalyst as the active component.

The grade 700 catalyst mole ratios of the components are as follows:

8MgCl$_2$; 1.5 AlCl$_3$; 1.25 anisole; 1.5 ethyl benzoate; and 0.51 TiCl$_4$.

The grade 700 modified catalyst mole ratios of the components are as follows:

8MgCl$_2$; 1.0 AlCl$_3$; 1.25 anisole; 1.5 ethyl benzoate; and 0.51 TiCl$_4$.

Both the standard grade 700 formulation and the modified grade 700 modified formulation were used as the active component to prepare standard formulation and modified formulation catalyst components in accordance with this invention. In each case the active component was heated in heptane. Different quantities of additional titanium tetrachloride were incorporated in the heptane for the different experiments to indicate the effects of titanium variation in the catalyst component of this invention. In each catalyst component which was prepared in the experiments, the titanium content is indicated in Table 4 below as the percentage of titanium as titanium metal based only on the solids content of the particular catalyst component in its slurried form.

Each catalyst component was used as a catalyst component for the polymerization of propylene generally in the manner indicated in Example V, in a liquid pool experiment. The results of the experiments are set out in Table 4 below. For the purposes of comparison, the catalyst in the first line of each of Tables 4A and 4B below is the starting grade 700 catalyst or grade 700 modified catalyst for the purposes of comparison.

TABLE 4

Comparison of Grade 761 Catalyst Prepared Using
Grade 700 Catalyst of Standard and Modified Formulations

| Catalyst Number | Wt. % Ti Computed | TEAL/ MPT Molar Ratio | Productivity Kg PP/g Cat. | II, % | Polymer Bulk Density g/cc |
|---|---|---|---|---|---|
| *Standard Formulation of Grade 700 Catalyst in Heptane with Added TiCl₄* | | | | | |
| 917[1] | 1.76 | 3.0 | 8.0 | 93.2 | 0.38 |
| 2354-34 | 1.99 | 3.0 | 9.8 | 92.5 | 0.40 |
| 2354-38 | 2.21 | 3.0 | 8.8 | 94.0 | 0.43 |
| 2354-39 | 3.68 | 3.0 | 10.3 | 93.5 | 0.43 |
| 2373-13 | 5.07 | 3.0 | 12.2 | 94.4 | 0.42 |
| 2373-13 | 5.07 | 2.5 | 9.0 | 95.0 | 0.41 |
| *Modified Formulation of Grade 700 Modified Catalyst in Heptane with Added TiCl₄* | | | | | |
| 2415-3[2] | 1.84 | 3.0 | 8.1 | 93.3 | 0.38 |
| 2354-49 | 2.07 | 3.0 | 9.2 | 95.7 | 0.45 |
| 2373-3 | 2.28 | 3.0 | 11.3 | 95.8 | 0.45 |
| 2373-1 | 3.74 | 3.0 | 12.6 | 95.7 | 0.44 |
| 2373-5 | 5.36 | 3.0 | 15.2 | 94.6 | 0.44 |
| 2373-5 | 5.36 | 2.5 | 11.5 | 96.2 | 0.44 |

[1] starting Grade 700 catalyst as active component.
[2] starting Grade 700 modified catalyst as active component.

It will be noted from Tables 4A and 4B that the catalyst component in accordance with the modified formulation provides improved productivity, isotacticity and polymer bulk density over the standard formulation. It will also be noted from Table 4 that the isotacticity tends to increase as the titanium concentration increases. However, both productivity and polymer bulk density increase to a peak and then start reducing as the titanium concentration increases.

Table 4 again demonstrates the surprising result of the catalyst component in accordance with this invention, where the addition of non-impregnated titanium does, contrary to the teachings of the prior art, provide an improved performance.

EXAMPLE IX

The performance of the grade 700 catalyst was compared with a grade 750 catalyst, that is a grade 700 catalyst heated in hexane generally in the manner of Example III, except that the heptane of Example III was replaced by hexane. The grade 700 starting catalyst was identified by catalyst number 2235-36-8. The grade 750 catalysts were identified by catalyst numbers 2354-10, 2354-20-6, and 2354-20-14. The performance of these two catalysts are compared in the graphs of attached FIG. 1. It will be noted from FIG. 1 that heating of the standard grade 700 catalyst in an inert solvent such as hexane in accordance with this invention, provides an improved productivity and an improved isotacticity index as reflected by the difference between the solid line for the grade 700 starting catalyst, and the dotted line for the grade 750 catalyst in accordance with this invention.

EXAMPLE X

Corresponding experiments were conducted to compare the performance of the grade 700 modified catalyst with the grade 750 modified catalyst component. These results are contained in attached FIG. 2. It will be noted that there is even a more marked difference between the productivity and isotacticity index of the grade 750 modified catalyst (catalyst number 2327-1W) in relation to the grade 700 modified catalyst (catalyst number 2235-29-8).

EXAMPLES XI and XII

Similar experiments to those of Examples IX and X were conducted to compare the performance of the grade 700 catalyst with the grade 751 catalyst component; and the grade 700 modified catalyst with the grade 751 modified catalyst component. In other words, the catalyst components in accordance with this invention were prepared utilizing heptane as the inert hydrocarbon solvent in Examples XI and XII, rather than hexane as was used in Examples IX and X. The results of these experiments are set out in attached FIGS. 3 and 4.

Figure 3:
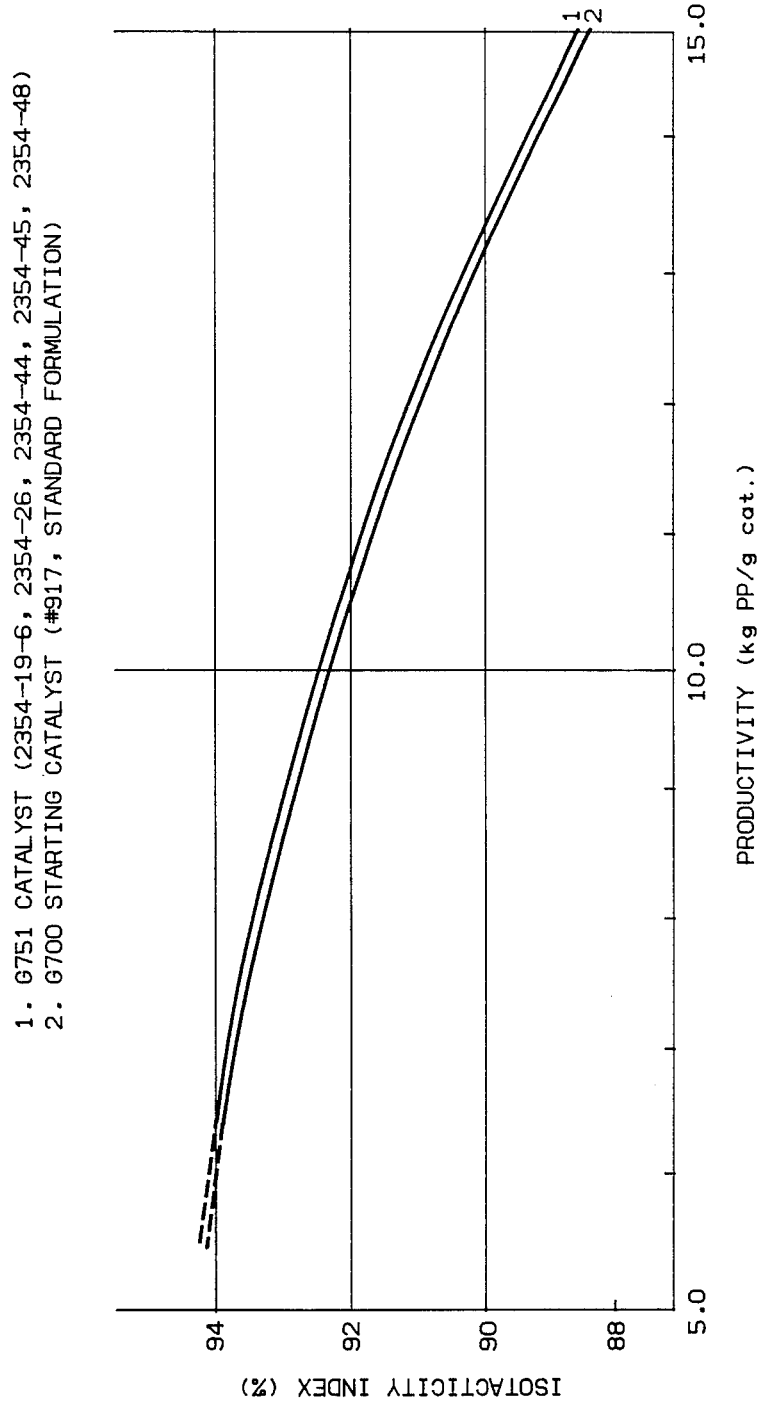
FIG. 3 is a graph comparing the performance of grade 700 catalyst and grade 751 catalyst.

In FIG. 3 the line identified by numeral 1 represents the grade 751 catalyst component in accordance with this invention (catalyst numbers 2354-19-6, 2354-26, 2354-44, 2354-45, 2354-48) whereas the line identified by numeral 2 represents the grade 700 starting catalyst (catalyst number 917).

Figure 4:
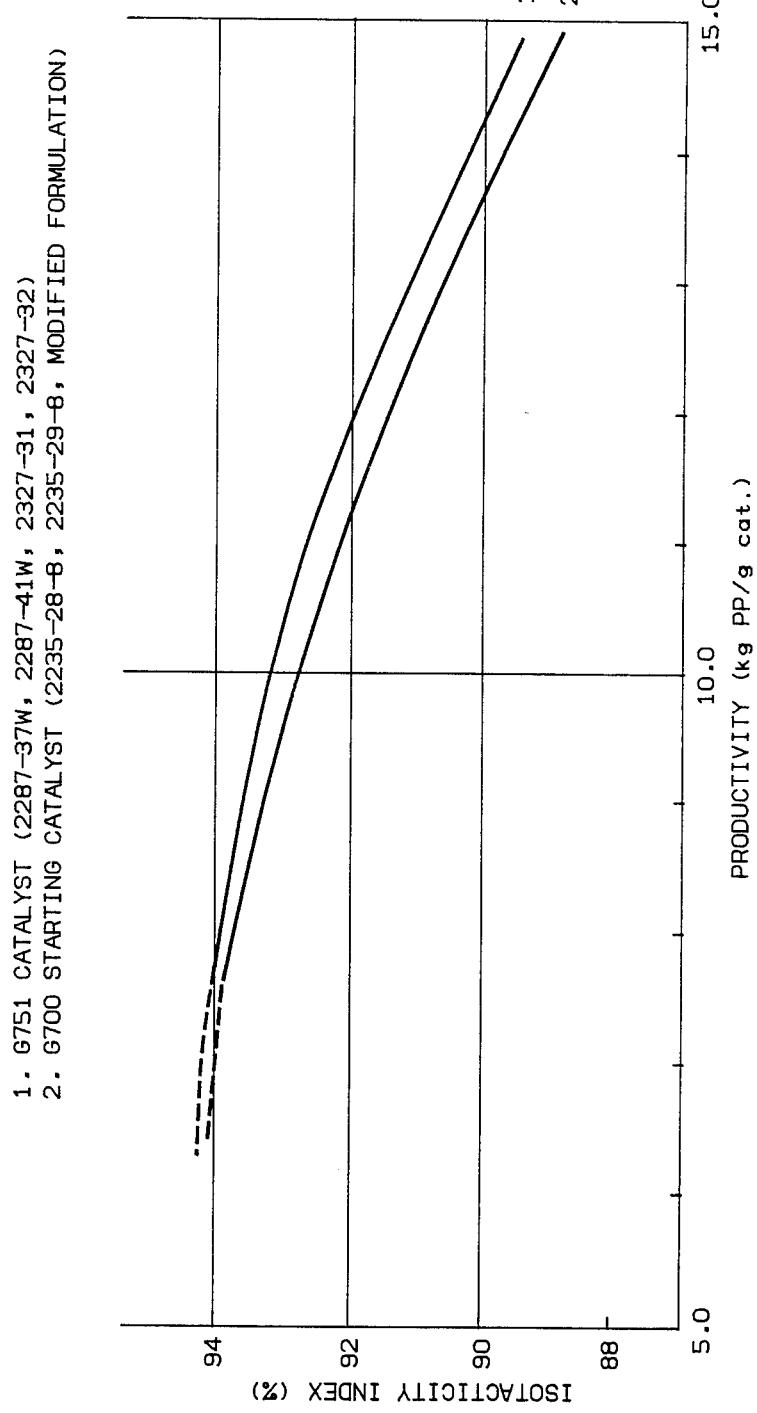
FIG. 4 is a graph comparing the performance of grade 700 modified catalyst and grade 751 catalyst.

In FIG. 4 line 1 represents the grade 751 catalyst component (catalyst numbers 2287-37W, 2287-41W, 2327-31, 2327-32) whereas the line identified by numeral 2 represents the grade 700 modified starting catalyst (catalyst number 2235-28-8, 2235-29-8).

Figure 2:
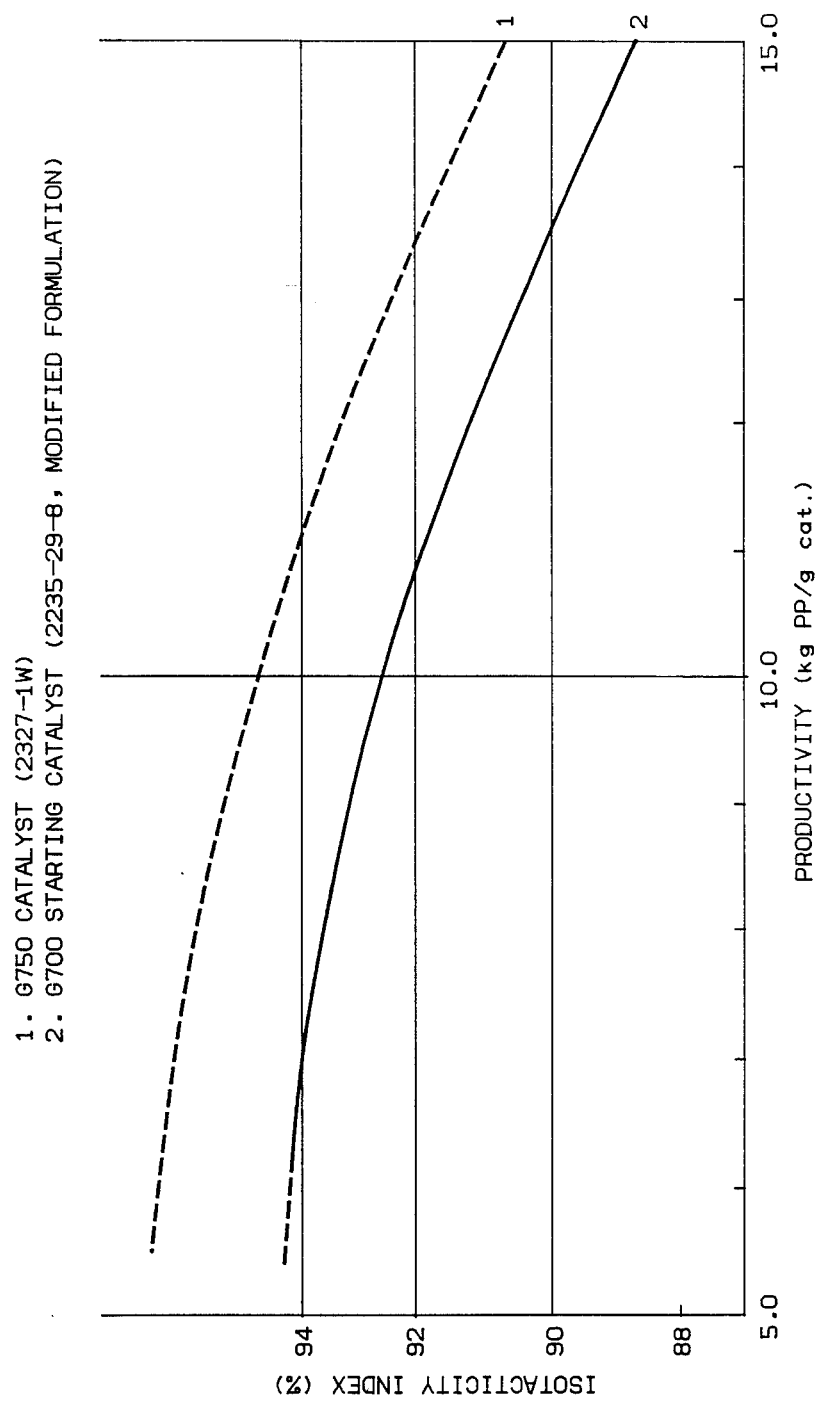
FIG. 2 is a graph comparing the performance of grade 700 modified catalyst and grade 750 modified catalyst.

It will be noted from both FIG. 3 and FIG. 4 that the performance differences between the catalyst components in accordance with this invention and the starting grade 700 catalyst or modified catalyst, as the case may be, is much less marked than in the case of FIGS. 1 and 2. This indicates that hexane appears to be a better inert hydrocarbon solvent than heptane in carrying out this invention.

It will be noted, however, that for any given productivity, the isotacticity index in FIG. 4 will be greater than the isotacticity index in FIG. 3. This appears to be attributable to the modification of the formulation by reducing the aluminum trichloride content.

EXAMPLES XIII and XIV

Further experiments were conducted to further compare the effects of variation of the type of inert hydrocarbon solvent used in carrying out the solvent heating step of the process in accordance with this invention.

In Example XIII the grade 700 starting catalyst (catalyst number 2235-36-8) was compared with the catalyst component in accordance with this invention formed by treating the grade 700 starting catalyst in mineral oil (PRIMOL-335 of Exxon) to yield grade 752 catalyst (catalyst numbers 2327-37, 2354-1, 2354-4). The results of the experiments of Example XIII are set out in FIG. 5.

In Example XIV the performance of the grade 700 modified catalyst (catalyst number 2235-29-8) was compared with the performance of the grade 752 catalyst components (catalyst numbers 2287-24, 2327-6) formed by heating the grade 700 modified catalyst in mineral oil (PRIMOL-335 of Exxon) in accordance with the heating step of this invention. The results of these experiments are set out in FIG. 6.

Figure 5:
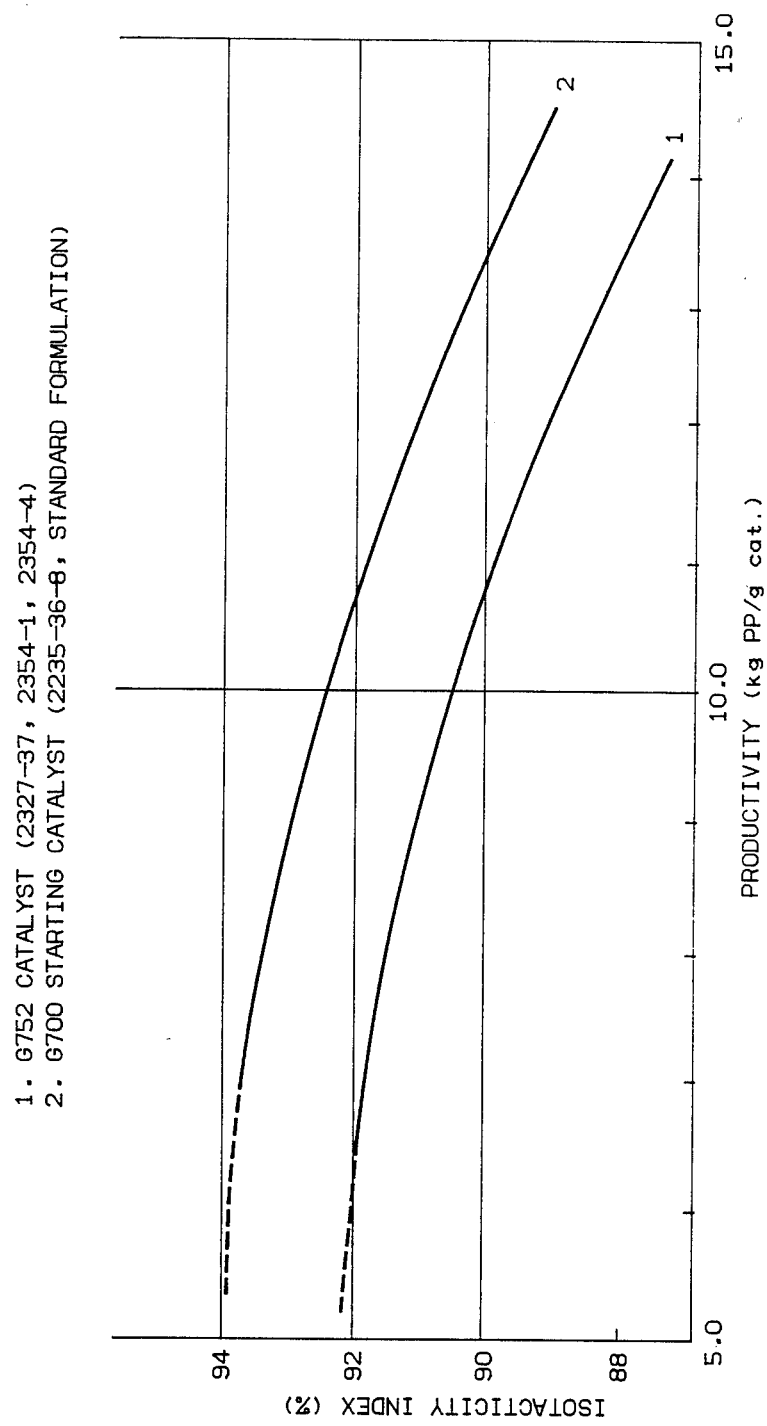
FIG. 5 is a graph comparing the performance of grade 700 catalyst and grade 752 catalyst.
Figure 6:
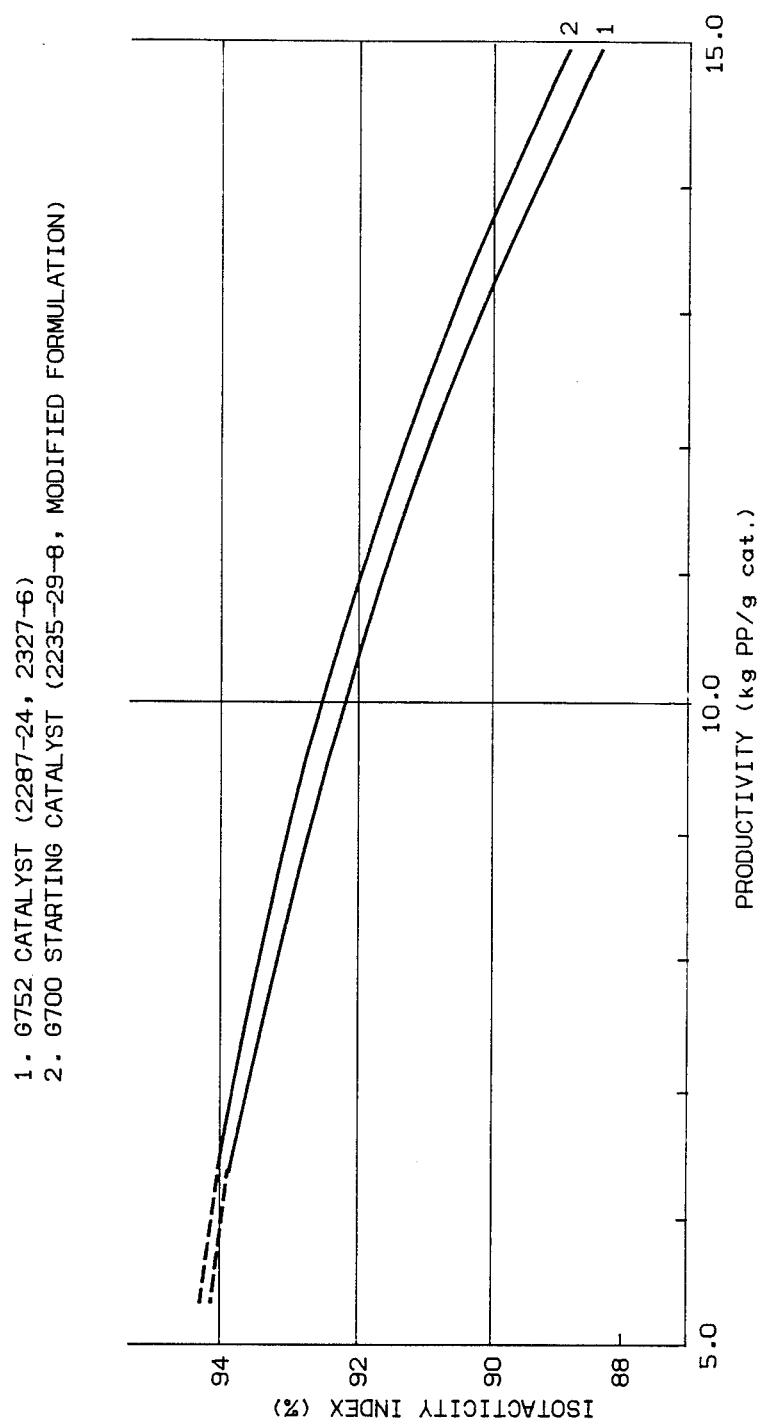
FIG. 6 is a graph comparing the performance of grade 700 modified catalyst and grade 752 calalyst.

It will be noted from FIGS. 5 and 6 that in each case the line identified by reference numeral 2 for the starting grade 700 catalyst provided an improved productivity and an improved isotacticity index over the grade 752 catalyst or modified catalyst. The results of the experiments reported in FIGS. 5 and 6, indicate that PRIMOL is not a suitable inert hydrocarbon solvent for the process of this invention. These results further suggest that an inert hydrocarbon solvent of lesser carbon atom content would tend to be preferable to one of greater carbon atom content.

EXAMPLE XV

Various further experiments were conducted to evaluate the performance of various grade 761 catalysts with various loadings of titanium. The grade 761 catalysts were prepared using a starting grade 700 catalyst formulation, and heating that formulation in the presence of heptane with various added quantities of titanium tetrachloride. The performances of the grade 761 catalyst were compared with each other and with the performance of the grade 700 modified catalyst.

A summary of the results of these experiments is set out in Table 5 below. In each case the weight percent titaniun in catalyst is reflected as the percentage of titanium as titanium metal by weight in the catalyst component based only on the solids content of the catalyst component.

TABLE 5

Grade 761 Catalyst Prepared with Various Loadings of Titanium

| Catalyst Number | Targeted wt. % Ti in Catalyst | % Ti in Solids | TEAL/MPT Molar Ratio | C.E. g PP/g Cat. | I.I. % | B.D. (U.T.) g/cc |
|---|---|---|---|---|---|---|
| 2515-3[1] | 1.84 | 1.84 | 3.4 | 10,500 | 92.4 | 0.39 |
| | | | | 10,500 | 92.2 | 0.39 |
| 2354-49 | 2.07 | | 3.4 | 11,400 | 94.9 | 0.43 |
| | | | | 12,400 | 94.5 | 0.43 |
| | | | 3.0 | 9,200 | 95.6 | 0.45 |
| | | | | 9,300 | 95.8 | 0.45 |
| | | | 2.5 | 8,200 | 96.2 | 0.44 |
| | | | | 8,200 | 95.9 | 0.44 |
| 2373-3 | 2.28 | | 3.0 | 11,200 | 95.9 | 0.46 |
| | | | | 11,400 | 95.6 | 0.45 |
| 2373-1 | 3.74 | 3.34[3] | 3.4 | 14,800[2] | 94.5 | 0.46 |
| | | | | 13,800[2] | 94.8 | 0.45 |
| | | | 3.0 | 11,300 | 96.9 | 0.44 |
| | | | | 13,800 | 94.9 | 0.45 |
| | | | 2.5 | 10,700 | 96.5 | 0.45 |
| | | | | 10,900 | 96.2 | 0.45 |
| 2373-5 | 5.36 | 4.04[3] | 3.0 | 15,200[2] | 94.7 | 0.44 |
| | | | | 15,100[2] | 94.5 | 0.44 |
| | | | 2.5 | 10,300 | 96.2 | 0.44 |
| | | | | 12,700 | 96.1 | 0.44 |
| 2373-12 | 7.5 | | 2.5 | 9,700 | 96.6 | 0.43 |
| | | | | 10,500 | 96.6 | 0.43 |
| | | | 3.0 | 12,700 | 93.1 | 0.42 |
| | | | | 12,800 | 94.0 | 0.42 |

[1]Grade 700 modified catalyst.
[2]Monomer used up before the one hour run time.
[3]Calculated from Ti analysis of supernatent liquid only.

The results of these experiments are further set out in annexed FIGS. 7-11.

Figure 7:
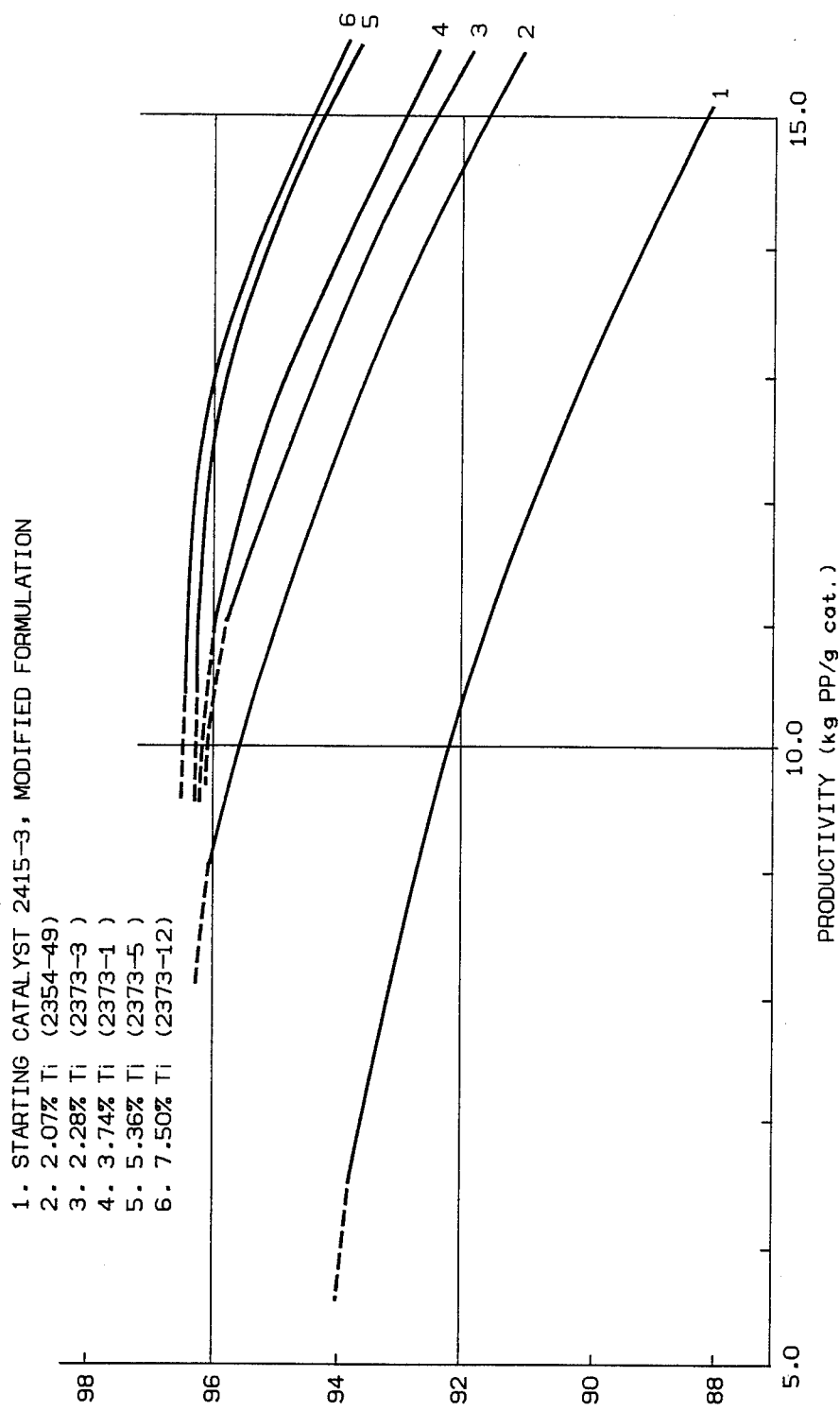
FIG. 7 is a graph comparing the performance of grade 761 catalyst with difference titanium levels and the grade 700 modified catalyst.
Figure 8:
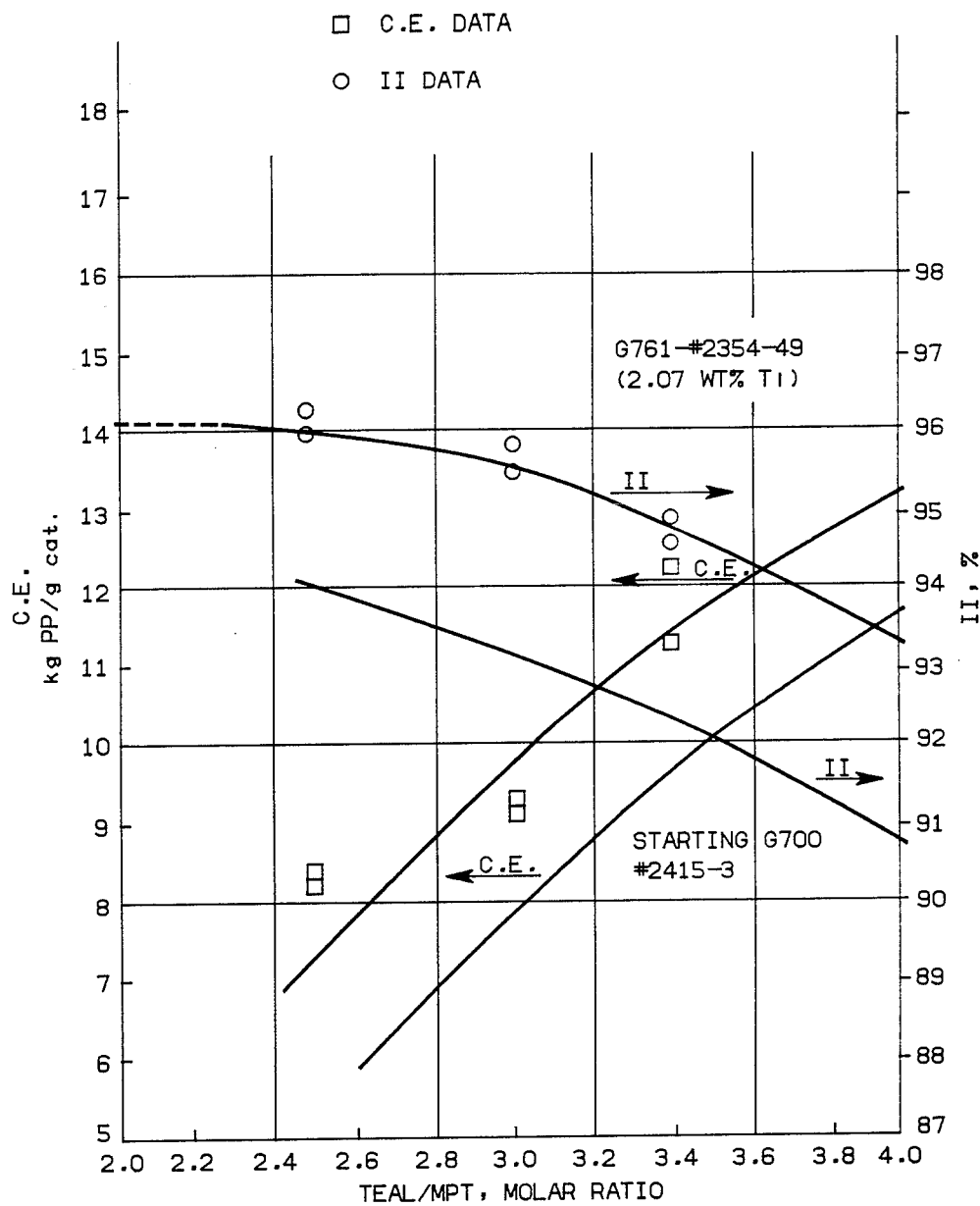
FIGS. 8–11 are graphs comparing the performance of the grade 700 modified catalyst of FIG. 7 with the grade 761 catalyst formulations represented by curves 2–5 of FIG. 7.
Figure 9:
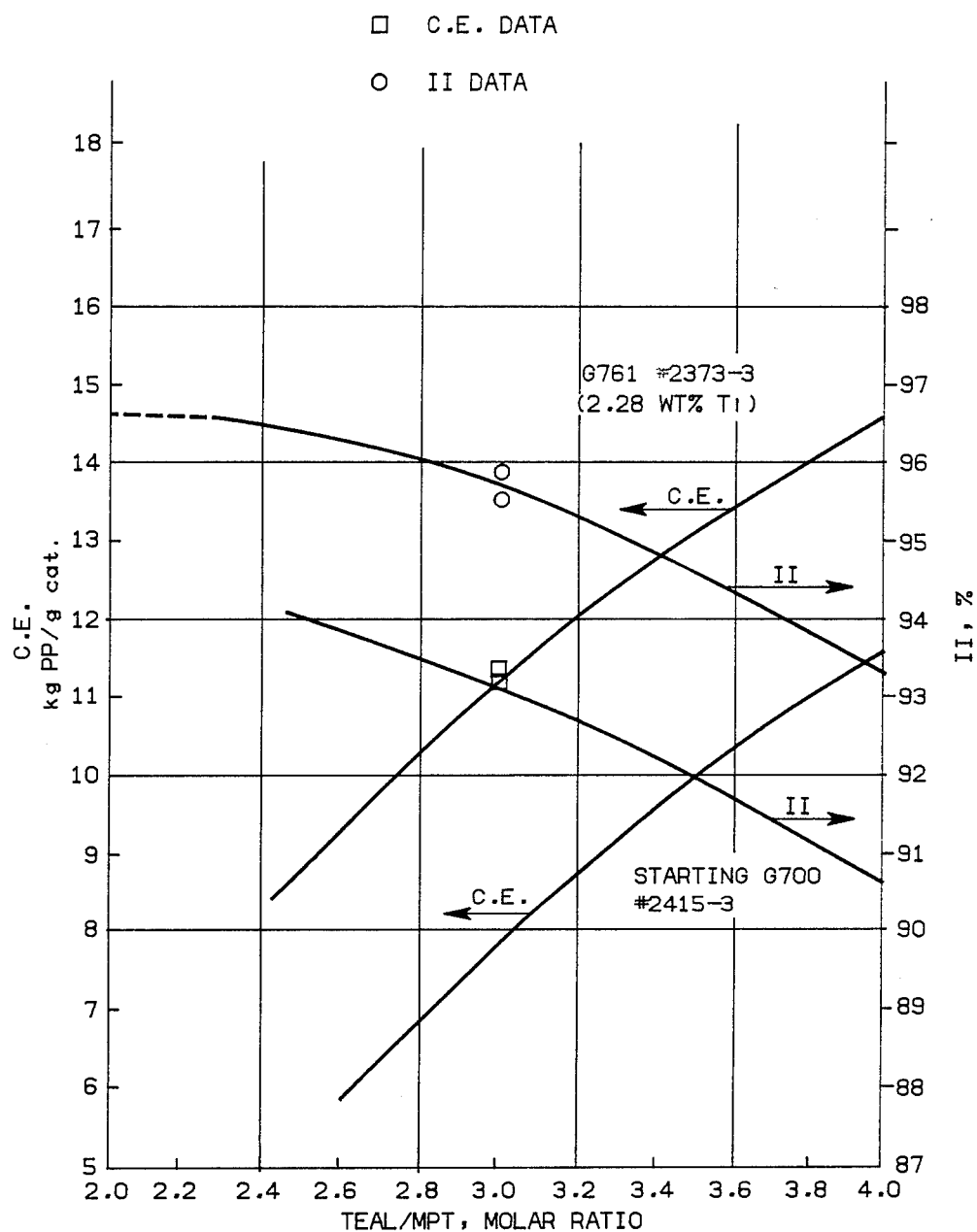
Figure 10:
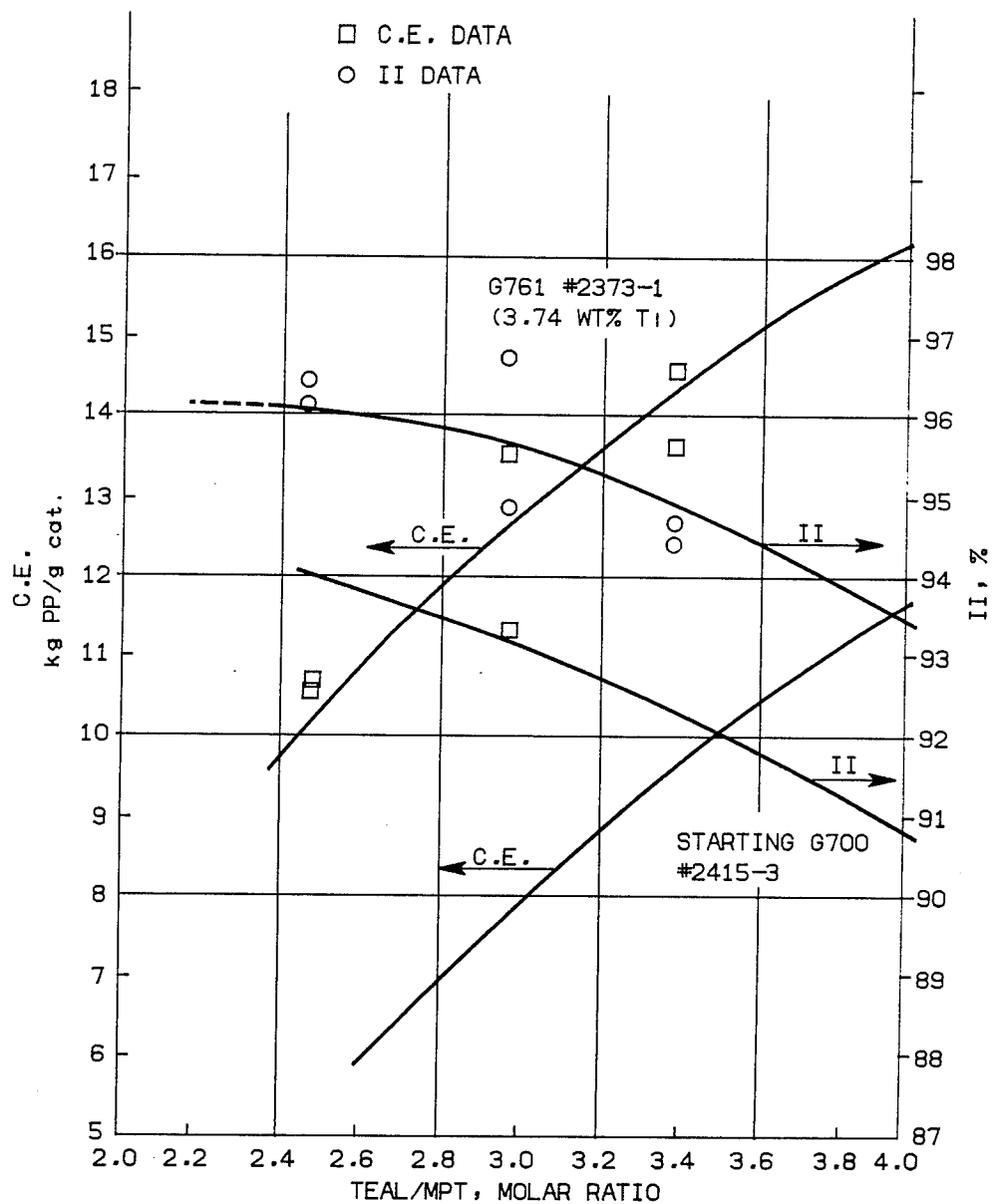

In FIG. 7, the perrormance of the grade 761 catalyst components with different Ti levels are compared with each other and with the starting grade 700 modified catalyst.

The curves in FIG. 7 are identified by reference numerals 1-6 and these represent the following:
1. starting grade 700 modified catalyst number 2415-3;
2. 2.07% Ti (catalyst number 2354-49);
3. 2.28% Ti (catalyst number 2373-3);
4. 3.74% Ti (catalyst number 2373-1);
5. 5.36% Ti (catalyst number 2373-5);
6. 7.50% Ti (catalyst number 2373-12).

It will be noted from the curves on FIG. 7 that there is a large jump in productivity and isotacticity index between the curves 1 and 2. This is believed to be due in a certain measure to compression.

It will be noted from Table 5 and from FIG. 7 that the catalyst efficiencies and the isotacticity indices increase as the titanium content increases until they reach a peak, whereafter they start decreasing. The bulk density does likewise increase to a peak and then start decreasing, but the decreasing effect is less marked than in the case of catalyst erficiency and isotacticity indices.

Figure 11:
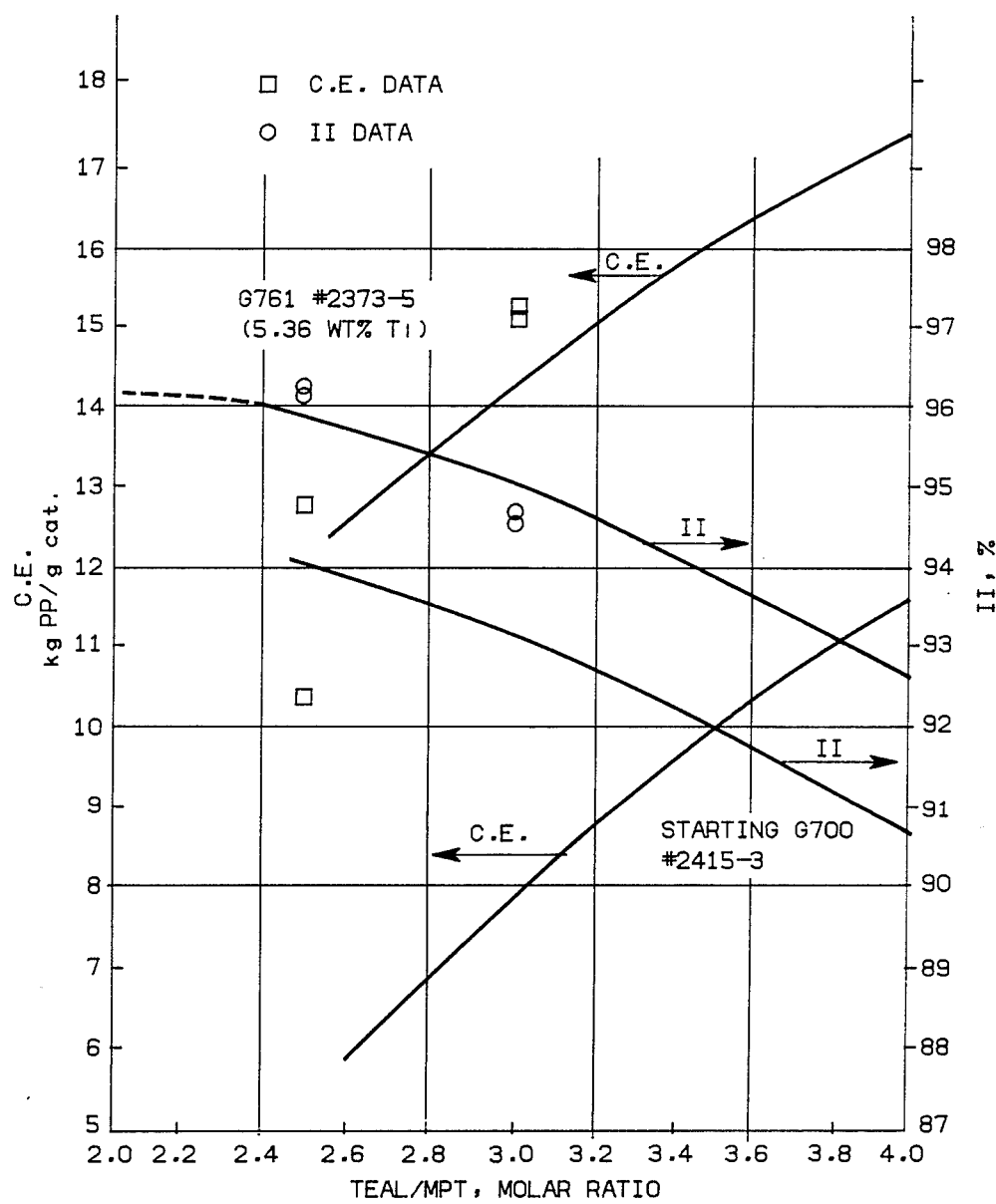

In FIGS. 8 to 11 the performances of the grade 700 starting modified catalyst (catalyst number 2415-3) of FIG. 7 is compared in each instance with the grade 761 catalyst formulations represented by curve 2 in FIG. 7 (for FIG. 8); curve 3 of FIG. 7 (FIG. 9); curve 4 of FIG. 7 (FIG. 10); and curve 5 of FIG. 7 (for FIG. 11).

In each of FIGS. 8 to 11, therefore, the catalyst efficiencies and the isotacticity indices of the particular grade 761 catalyst components are compared with the staring grade 700 modified catalyst. The plot data for the catalyst efficiencies are represented by squares on the graphs of FIGS. 8 to 11, whereas the data points for the isotacticity indices are represented by circles.

It will be noted from FIGS. 8 to 11 that for each TEAL/MPT molar ratio, both the catalyst efficiency and the isotacticity index of the catalyst components in accordance with this invention are superior in performance to the starting grade 700 modified catalyst.

The TEAL/MPT molar ratio for utilization of the catalyst components in accordance with this invention can therefore be varied to provide desired catalyst efficiencies with desired isotacticity indices.

The various experiments which have been performed show that the catalyst component in accordance with this invention, which is prepared by treating an active component in a suitable inert solvent, with or without the inclusion of additional active transition metal compound, can provide a substantially improved performance over the untreated active component. In particular, the catalyst component in accordance with this invention, when treated in an appropriate inert hydrocarbon solvent can provide an improved productivity, and improved isotacticity and an improved bulk density.

The experiments which have been conducted further show that the performance of the catalyst component in accordance with this invention improves as the carbon atom content of the inert hydrocarbon solvent decreases.

Most surprisingly and unexpectedly, however, the experiments show that the inclusion of an additional quantity of active transition metal, including free active transition metal which remains in the liquid portion of the catalyst component and is free in the sense that it has not become impregnated into the solid portion of the catalyst component, can be advantageous and can lead to a distinct improvement in catalyst performance. This is despite all the contrary teachings in the art which deals with similar active transition metal compounds. This provides the substantial advantage that the costs involved in repeatedly treating the catalyst component to remove and eliminate all traces of non-impregnated active transition metal compound, component or complex can be totally eliminated.

The catalyst component of this invention in slurry form, may be used as such or may be stored as such for subsequent use. Applicants have found that if the catalyst component is stored in slurry form at room temperature, it unexpectedly shows no significant deterioration after 7 to 8 months. In contrast therewith, if the grade 700 catalyst is stored at room temperature degradation is visible after one month.

The experiments which have been conducted tend to show that catalyst component formulations in accordance with this invention made with the grade 700 modified catalyst have improved performance over those made with the grade 700 catalyst. Applicants believe that further improvements should be provided if the mole proportion of the aluminum trichloride is further reduced below 1.0 moles to say 0.7 moles or even less. For specific applications of the invention, therefore, the mole proportion of aluminum trichloride should be reduced further down to say 0.7 or possibly 0.5. Applicants believe that if the aluminum trichloride content is reduced to a level which is too low, the stereospecificity of the polypropylene will drop significantly. This will be expected to occur when the molar proportion of aluminum trichloride drops below about 0.5.

The catalyst component of this invention may be sized to achieve a polymer with a required minimum fine size particles. Variations in the milling times in the production of the active component permit variations of the coarseness of the particles of solid catalyst component, and thus of the produced polymer.

Because of the high productivity which can be provided by the catalyst component of this invention, catalyst residues would tend to be reduced in the final polypropylene product. This will therefore eliminate or at least substantially reduce the need for polymer deashing. The high isotacticity index of polymers which can be produced utilizing the catalyst components of this invention, will also tend to permit a reduction in or a complete elimination of the expensive step of polymer extraction and solvent recovery from polymer production processes using liquid monomer. This would therefore tend to result in significant cost savings.

Further significant cost savings will also tend to be provided by the fact that the active transition metal compound proportion can be increased in accordance with the process of this invention, and that excess active transition metal compound need not be removed or need not be thoroughly removed. This will significantly reduce not only the capital costs of a plant for producing the catalyst component, but also the operating costs.

We claim:

1. A method of producing a polymerization catalyst component suitable for use in the polymerization of alpha-olefins, which method comprises:

heating in an inert hydrocarbon solvent an active component formed by co-comminuting an inorganic Lewis acid, a first organic electron donor, a support base selected from the group consisting of the Group IIA and IIIA salts and the salts of the multivalent metals of the first transition series with the exception of copper, and a polymerization active tri- and tetra-, or penta- valent transition metal compound of a Group IVB–VIB metal, said heating being at a temperature of between about 40° to 150° C. for a period of between about 1–24 hours to produce the polymerization catalyst.

2. A method according to claim 1, in which the active component is formed by first forming a component support by co-comminuting an inorganic Lewis acid, a first organic electron donor, and a support base selected from the group consisting of the Group IIA and IIIA salts and the salts of the multivalent metals of the first transition series with the exception of copper, and then co-comminuting the component support with a polymerization active tri-, tetra-, or penta- valent transition metal compound of a Group IVB–VIB metal.

3. A method according to claim 2, in which the active component is heated in the inert hydrocarbon solvent in the presence of an additional quantity of polymerization active tri-, tetra-, or penta- valent transition metal compound of a Group IVB–VIB metal.

4. A method according to claim 1, which includes the step of incorporating a second organic electron donor.

5. A method according to claim 2, which includes the step of incorporating a second organic electron donor, and in which the second organic electron donor is co-comminuted together with the component support or with the components of the component support.

6. A method according to claim 4, in which the second organic electron donor is co-comminuted with the active transition metal compound.

7. A method according to claim 4, in which the second organic electron donor is co-comminuted after the addition of the active transition metal compound.

8. A method according to claim 4, in which the first and second electron donors are selected from the group consisting of organic electron donor compounds containing at least one atom of oxygen, sulfur, nitrogen or phosphorus to function as the electron donor atom.

9. A method according to claim 8, wherein the electron donors are selected from the group consisting of ethers, esters, ketones, aldehydes, alcohols, carboxylic acids, phenols, thioethers, thioesters, thioketones, amines, amides, nitriles, isocyanates and phosphines.

10. A method according to claim 8, in which the electron donors are selected from the group consisting of ethers and esters.

11. A method according to claim 8, in which the first electron donor is an ether in the form of anisole, and in which the second electron donor is an ester in the form of ethyl benzoate.

12. A method according to claim 4, in which the inert hydrocarbon solvent is an inert saturated hydrocarbon.

13. A method according to claim 12, in which the inert saturated hydrocarbon is an aliphatic hydrocarbon.

14. A method according to claim 13, in which the aliphatic hydrocarbon has between about 2 and 9 carbon atoms.

15. A method according to claim 14, in which the saturated hydrocarbon is selected from the group consisting of heptane, hexane, pentane, iso-pentane, butane, propane and ethane.

16. A method according to claim 4, in which the solvent to component ratio is at least sufficient for adequate wetting of the component to permit the formation of a slurry.

17. A method according to claim 16, in which the solvent to component ratio is between about 2:1 and 1:1 by weight.

18. A method according to claim 4, in which the inorganic Lewis acid is a metal salt selected from the group consisting of the Group IIIA halides, phosphorus trichloride and phosphorous oxytrichloride.

19. A method according to claim 18, in which the Lewis acid is aluminum trichloride.

20. A method according to claim 4, in which the support base is a magnesium or maganese salt.

21. A method according to claim 20, in which the support base is $MgCl_2$.

22. A method according to claim 1, in which the polymerization active transition metal compound is selected from the group consisting of titanium, vanadium, chromium and zirconium compounds.

23. A method according to claim 4, in which the polymerization active transition metal compound is a titanium halide.

24. A method according to claim 23, in which the titanium halide is $TiCl_4$.

25. A method according to claim 24, in which the titanium content in the polymerization catalyst component is between about 2% and about 10% by weight of titanium as a metal based on the weight of the solid portion of the catalyst component.

26. A method according to claim 25, in which the titanium content is between about 3 to 6% by weight of titanium as metal based on the weight of the solid portion of the catalyst component.

27. A method according to claim 3, in which the polymerization active transition metal compound is titanium tetrachloride.

28. A method according to claim 27, in which the method is performed for portion of the titanium component comprising at least about 40 to 60% of the total titanium content of the catalyst component, to be incorporated into the solid portion of the catalyst component by co-comminution, and for the remaining portion of the titanium component to be incorporated with the inert hydrocarbon solvent.

29. A method according to claim 28, in which the portion of titanium incorporated into the solid portion of the catalyst component by co-comminution is at least about 70 to 75% of the total titanium content.

30. A method according to claim 1, in which the active component is heated in the inert hydrocarbon solvent at a temperature between about 60° to 100° C. for a period of between about 2 to 24 hours.

31. A method according to claim 4, in which for every 8 moles of support base used, up to about 3 moles of Lewis acid are used, between about 0.4 to about 3 moles of first electron donor are used, between about 0.5 to about 3 moles of second electron donor are used, and between about 0.1 and 5 moles of active transition metal compound are used.

32. A method according to claim 31, in which for every 8 moles of support base used, between about 0.5 to about 2 moles of Lewis acid are used, between about 1.0 to about 1.5 moles of first electron donor are used, between about 0.8 and about 2 moles of second electron donor are used, and between about 0.4 and about 2 moles of active transition metal compound are used.

33. A method according to claim 31, in which the support base is $MgCl_2$, in which the Lewis acid is $AlCl_3$, in which the first electron donor is anisole, in which the second electron donor is ethyl benzoate, and in which the active transition metal compound is $TiCl_4$.

34. A method according to claim 33, in which the $MgCl_2$ and $AlCl_3$ are first milled, in which ethyl benzoate is then added and milled in, in which anisole is then added and milled in, and in which the $TiCl_4$ is then added and milled in to form the active component.

35. A method according to claim 33, in which the individual constituents are used in the following proportions:
   (a) $MgCl_2$—about 8 moles;
   (b) $AlCl_3$—about 0.5 to 1.5 moles;
   (c) anisole—about 1 to 1.5 moles;
   (d) ethyl benzoate—about 1 to 2 moles; and
   (e) $TiCl_4$—about 0.4 to 2 moles.

36. A method according to claim 35, in which the individual constituents are in the following proportions:
   (a) $MgCl_2$—about 8 moles;
   (b) $AlCl_3$—about 1 mole;
   (c) anisole—about 1.25 moles;
   (d) ethyl benzoate—about 1.5 moles; and
   (e) $TiCl_4$—about 1.5 moles.

37. A method according to claim 35, in which the individual constituents are in the following proportions:
   (a) $MgCl_2$—about 8 moles;
   (b) $AlCl_3$—about 0.7 moles;
   (c) anisole—about 1.25 moles;
   (d) ethyl benzoate—about 1.5 moles; and
   (e) $TiCl_4$—about 1.5 moles.

38. A method according to claim 35, in which the individual constituents are in the following proportions:
   (a) $MgCl_2$—about 8 moles;
   (b) $AlCl_3$—about 1 mole;
   (c) anisole—about 1.25 moles;
   (d) ethyl benzoate—about 1.5 moles; and
   (e) $TiCl_4$—about 1 mole.

39. A method according to claim 4, in which the polymerization catalyst component is recovered as a slurry for use in the polymerization of alpha-olefins.

40. A method according to claim 4, in which the inert solvent is at least partially evaporated after the heating step to yield the catalyst component for use, in which the inert solvent is evaporated after the heating step and the catalyst component is dried for use, or in which the inert solvent is filtered off after the heating step without washing of the components to yield the solid catalyst component for use.

41. A polymerization catalyst component suitable for use in the polymerization of apha-olefins, the component being produced by:
   heating an active component in an inert hydrocarbon solvent, said active component being formed by co-comminuting an inorganic Lewis acid, a first organic electron donor, a support base selected from the group consisting of the Group IIA and IIIA salts and the salts of the multivalent metals of the first transition series with the exception of copper, and a polymerization active tri- tetra-, or penta- valent transition metal compound of a Group IVB–VIB metal, said heating being at a temperature of between about 60° to 100° C. for a period of between about 2–24 hours.

42. A component according to claim 41, in which the component is produced by first forming a component support by co-comminuting an inorganic Lewis acid, a first organic electron donor, and a support base selected from the group consisting of the Group IIA and IIIA salts and the salts of the multivalent metals of the first transition series with the exception of copper, and then forming an active component by co-comminuting the component support with a polymerization active tri-, tetra-, or penta- valent transition metal compound of a Group IVB–VIB metal.

43. A component according to claim 41, produced by heating the active component in the inert hydrocarbon solvent in the presence of an additional quantity of polymerizaiton active tri-, tetra-, or penta- valent transition metal compound of a Group IVB–VIB metal.

44. A component according to claim 41, produced by incorporating a second organic electron donor in the active component.

45. A component according to claim 44, in which the electron donors are selected from the group consisting of ethers and esters.

46. A component according to claim 45, in which the first electron donor is an ether in the form of anisole, and in which the second electron donor is an ester in the form of ethyl benzoate.

47. A component according to claim 44, in which the inert hydrocarbon solvent is an aliphatic hydrocarbon having between about 2 and 9 carbon atoms.

48. A component according to claim 44, in which the Lewis acid is aluminum trichloride; in which the support base is $MgCl_2$ in which the polymerization active transition metal compound is $TiCl_4$.

49. A component according to claim 48, in which the titanium content in the polymerization catalyst component is between about 2% and about 10% by weight of titanium as metal based on the weight of the solid portion of the catalyst component.

50. A component according to claim 49, in which the titanium content is between about 3 to 6% weight of titanium as metal based or the weight of the solid portion of the catalyst component.

51. A component according to claim 48, in which portion of the titanium component comprising at least about 40 to 60% of the total titanium content, is incorporated into the solid portion of the catalyst component by co-comminution, and the remainder of the titanium component is incorporated together with the inert hydrocarbon solvent.

52. A component according to claim 44, which comprises for every 8 moles of support base, up to about 3 moles of Lewis acid, between about 0.5 to about 3 moles of first electron donor, between about 0.5 to about 3 moles of second electron donor, and between about 0.1 and 5 moles of active transition metal compound.

* * * * *